(12) United States Patent
Kobayashi et al.

(10) Patent No.: US 10,009,560 B2
(45) Date of Patent: Jun. 26, 2018

(54) IMAGING DEVICE FOR CONTROLLING SIGNAL CHARGE

(71) Applicant: CANON KABUSHIKI KAISHA, Tokyo (JP)

(72) Inventors: Masahiro Kobayashi, Tokyo (JP); Yusuke Onuki, Fujisawa (JP); Kazunari Kawabata, Mitaka (JP); Hiroshi Sekine, Kawagoe (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days. days.

(21) Appl. No.: 15/594,259

(22) Filed: May 12, 2017

(65) Prior Publication Data
US 2017/0359535 A1    Dec. 14, 2017

(30) Foreign Application Priority Data

Jun. 10, 2016  (JP) .................................. 2016-116083

(51) Int. Cl.
*H04N 5/335* (2011.01)
*H04N 5/357* (2011.01)
(Continued)

(52) U.S. Cl.
CPC ......... *H04N 5/3575* (2013.01); *H04N 3/1525* (2013.01); *H04N 5/3597* (2013.01);
(Continued)

(58) Field of Classification Search
CPC ........................... H04N 5/3575; H04N 5/3597
(Continued)

(56) References Cited

U.S. PATENT DOCUMENTS 7,271,835 B2    9/2007    Iizuka et al. .................. 348/314
7,462,810 B2    12/2008   Kobayashi et al. ....... 250/208.1
(Continued)

FOREIGN PATENT DOCUMENTS

| JP | 2004-111590 | 4/2004 |
|----|-------------|--------|
| JP | 2015-177349 | 10/2015 |
| WO | 2011/096340 | 8/2011 |

OTHER PUBLICATIONS

U.S. Appl. No. 15/467,919, filed Mar. 23, 2017.
(Continued)

*Primary Examiner* — Usman Khan
(74) *Attorney, Agent, or Firm* — Fitzpatrick, Cella, Harper & Scinto

(57) ABSTRACT

Provided is an imaging device that includes a plurality of pixels, each of the plurality of pixels including a photoelectric conversion unit configured to accumulate charges generated by an incident light, a first holding unit and a second holding unit configured to hold the charges, an amplification unit configured to output a signal based on the charges, a first transfer switch provided between the photoelectric conversion unit and the first holding unit, a second transfer switch provided between the photoelectric conversion unit and the second holding unit, a third transfer switch provided between the first holding unit and the amplification unit, and a fourth transfer switch provided between the second holding unit and the amplification unit, and outputs a signal including a signal based on actual signal charges and a signal including a signal based on false signal charges.

18 Claims, 14 Drawing Sheets

(51) Int. Cl.
*H04N 3/14* (2006.01)
*H04N 5/359* (2011.01)
*H04N 5/361* (2011.01)
*H04N 5/3745* (2011.01)

(52) U.S. Cl.
CPC ......... *H04N 5/361* (2013.01); *H04N 5/37452* (2013.01); *H04N 5/37457* (2013.01)

(58) Field of Classification Search
USPC .............................. 348/300, 221.1, 362, 374
See application file for complete search history.

(56) References Cited

U.S. PATENT DOCUMENTS

| | | | |
|---|---|---|---|
| 7,928,477 B2 | 4/2011 | Kobayashi et al. ........... | 257/225 |
| 7,935,995 B2 | 5/2011 | Watanabe et al. ............ | 257/292 |
| 8,045,034 B2 | 10/2011 | Shibata et al. ................ | 348/308 |
| 8,063,351 B2 | 11/2011 | Kobayashi et al. ........ | 250/208.1 |
| 8,115,848 B2 | 2/2012 | Onuki et al. ................. | 348/308 |
| 8,174,604 B2 | 5/2012 | Shibata et al. ................ | 348/308 |
| 8,222,682 B2 | 7/2012 | Watanabe et al. ............ | 257/292 |
| 8,259,206 B1 | 9/2012 | Shibata et al. ................ | 348/308 |
| 8,289,432 B2 | 10/2012 | Shibata et al. ................ | 348/308 |
| 8,357,956 B2 | 1/2013 | Kobayashi et al. ........... | 257/225 |
| 8,427,564 B2 | 4/2013 | Yamashita et al. ........... | 348/294 |
| 8,456,559 B2 | 6/2013 | Yamashita et al. ........... | 348/308 |
| 8,552,353 B2 | 10/2013 | Kobayashi et al. ........ | 250/208.1 |
| 8,723,232 B2 | 5/2014 | Kobayashi et al. .......... | 257/225 |
| 8,736,734 B2 | 5/2014 | Onuki et al. ................. | 348/308 |
| 8,786,745 B2 | 7/2014 | Kawahito et al. ............ | 348/296 |
| 8,884,391 B2 | 11/2014 | Fudaba et al. ................ | 257/432 |
| 9,019,141 B2 | 4/2015 | Hashimoto et al. ........... | 341/168 |
| 9,049,389 B2 | 6/2015 | Hashimoto et al. ... | H04N 5/353 |
| 9,147,708 B2 | 9/2015 | Okita et al. ......... | H01L 27/1461 |
| 9,153,610 B2 | 10/2015 | Kobayashi et al. ... | H04N 5/378 |
| 9,159,750 B2 | 10/2015 | Ikeda et al. ........... | H03M 1/186 |
| 9,247,161 B2 | 1/2016 | Hashimoto et al. ... | H04N 5/374 |
| 9,276,027 B2 | 3/2016 | Okita et al. ....... | H01L 27/14812 |
| 9,300,889 B2 | 3/2016 | Hashimoto et al. ... | H04N 5/357 |
| 9,344,653 B2 | 5/2016 | Shimotsusa et al. ......................... H01L 27/14623 |  |
| 9,419,038 B2 | 8/2016 | Kobayashi et al. ......................... H01L 27/14612 |  |
| 9,445,026 B2 | 9/2016 | Kobayashi et al. ......................... H01L 27/14636 |  |
| 9,485,445 B2 | 11/2016 | Hashimoto et al. ... | H04N 5/374 |
| 9,538,112 B2 | 1/2017 | Wada et al. ............ | H04N 5/378 |
| 9,548,328 B2 | 1/2017 | Hasegawa et al. . | H01L 27/1464 |
| 9,560,285 B2 | 1/2017 | Ichikawa et al. .... | H04N 5/2353 |
| 9,602,752 B2 | 3/2017 | Kobayashi et al. ......................... H01L 27/14603 |  |
| 9,615,044 B2 | 4/2017 | Hashimoto et al. ... | H04N 5/374 |
| 2008/0018761 A1* | 1/2008 | Kondo ................. | H04N 5/2353 348/306 |
| 2013/0206965 A1 | 8/2013 | Yamashita et al. ........ | 250/208.1 |
| 2014/0061436 A1 | 3/2014 | Kobayashi ................. | 250/208.1 |
| 2015/0264283 A1 | 9/2015 | Kobayashi et al. | H01L 27/1463 |
| 2015/0281614 A1 | 10/2015 | Yoshida et al. ...... | H04N 5/3745 |
| 2015/0281616 A1 | 10/2015 | Muto et al. ........... | H04N 5/3575 |
| 2016/0071896 A1 | 3/2016 | Kawabata et al. ......................... H01L 27/14621 |  |
| 2016/0071902 A1 | 3/2016 | Okita et al. ........ | H01L 27/14625 |
| 2016/0227139 A1 | 8/2016 | Shimotsusa et al. .................. H01L 27/14627 |  |
| 2016/0322406 A1 | 11/2016 | Kobayashi et al. ................... H01L 27/14612 |  |
| 2016/0334550 A1 | 11/2016 | Kawabata ............ | G02B 3/0056 |
| 2016/0334621 A1 | 11/2016 | Kawabata et al. ......................... H01L 27/14627 |  |
| 2016/0360126 A1 | 12/2016 | Soda et al. ........ | H01L 27/14641 |
| 2017/0077164 A1 | 3/2017 | Kawabata ........ | H01L 27/14645 |
| 2017/0078557 A1 | 3/2017 | Kawabata et al. . | H04N 5/37457 |
| 2017/0078594 A1 | 3/2017 | Kawabata et al. ... | H04N 5/2353 |
| 2017/0078604 A1 | 3/2017 | Kobayashi et al. . | H04N 5/3575 |
| 2017/0118428 A1 | 4/2017 | Muto et al. .......... | H04N 5/3658 |
| 2017/0142363 A1 | 5/2017 | Hashimoto et al. ... | H04N 5/378 |

OTHER PUBLICATIONS

U.S. Appl. No. 15/631,391, filed Jun. 23, 2017.
U.S. Appl. No. 15/584,718, filed May 2, 2017.
U.S. Appl. No. 15/601,620, filed May 22, 2017.

* cited by examiner

IMAGING DEVICE FOR CONTROLLING SIGNAL CHARGE

BACKGROUND OF THE INVENTION

Field of the Invention

The present invention relates to an imaging device and an imaging system.

Description of the Related Art

In recent years, global electronic shutters have been proposed for CMOS image sensors. For example, an imaging device disclosed in International Publication No. WO2011/096340 may use the global electronic shutter to avoid distortion of an image of an object moving fast.

The imaging device disclosed in International Publication No. WO2011/096340 has a circuit configuration in which each pixel includes a plurality of accumulating diodes as holding units. Charges generated by a photoelectric conversion element are transferred to each of the plurality of holding units and temporarily held therein. Then, charges accumulated in the plurality of holding units are sequentially transferred to a floating semiconductor region and the transferred charges are read out, and thereby a plurality of image signals can be acquired.

In an imaging device having a holding unit, a false signal, which may be a dark current, a leakage component of charges, a noise component due to photoelectric conversion at the holding unit itself, or the like, may be superimposed on the charges held in the holding unit. Therefore, the image quality of an acquired image is likely to be deteriorated due to a false signal. In order to perform correction for reducing influence of a false signal, a signal for correcting the false signal will be necessary.

SUMMARY OF THE INVENTION

An imaging device according to one embodiment of the present invention includes a plurality of pixels, each of the plurality of pixels including a photoelectric conversion unit configured to accumulate charges generated by an incident light, a first holding unit and a second holding unit configured to hold the charges, an amplification unit configured to output a signal based on the charges, a first transfer switch provided between the photoelectric conversion unit and the first holding unit, a second transfer switch provided between the photoelectric conversion unit and the second holding unit, a third transfer switch provided between the first holding unit and the amplification unit, and a fourth transfer switch provided between the second holding unit and the amplification unit. By being controlled to be on, the first transfer switch transfers, from the photoelectric conversion unit to the first holding unit, actual signal charges accumulated in the photoelectric conversion unit in an exposure period of one frame. By being maintained to be off from a time when the fourth transfer switch is controlled to be off to a time when again controlled to be on, the second transfer switch does not transfer the actual signal charges from the photoelectric conversion unit to the second holding unit. By being controlled to be on after the exposure period, the third transfer switch transfers, from the first holding unit to the amplification unit, the actual signal charges transferred to the first holding unit and first false signal charges accumulated in the first holding unit. By being controlled to be on, the fourth transfer switch transfers, from the second holding unit to the amplification unit, a second false signal charges accumulated in the second holding unit.

An imaging device according to another embodiment of the present invention includes a plurality of pixels, each of the plurality of pixels including a photoelectric conversion unit configured to accumulate charges generated by an incident light, a first holding unit and a second holding unit configured to hold the charges, an amplification unit configured to output a signal based on the charges, a first transfer switch provided between the photoelectric conversion unit and the first holding unit, a second transfer switch provided between the photoelectric conversion unit and the second holding unit, a third transfer switch provided between the first holding unit and the amplification unit, and a fourth transfer switch provided between the second holding unit and the amplification unit. By being controlled to be on, the first transfer switch transfers, from the photoelectric conversion unit to the first holding unit, actual signal charges accumulated in the photoelectric conversion unit in an exposure period of one frame. The second transfer switch is temporarily turned on after the photoelectric conversion unit starts accumulation of charges. By being controlled to be on after the exposure period, the third transfer switch transfers, from the photoelectric conversion unit to the amplification unit, the actual signal charges transferred to the first holding unit and first false signal charges accumulated in the first holding unit. By being controlled to be on, the fourth transfer switch transfers, from the photoelectric conversion unit to the amplification unit, a second false signal charges accumulated in the second holding unit.

An imaging device according to another embodiment of the present invention includes a plurality of pixels, each of the plurality of pixels including a photoelectric conversion unit configured to accumulate charges generated by an incident light, a first holding unit and a second holding unit configured to hold the charges, an amplification unit configured to output a signal based on the charges, a first transfer switch provided between the photoelectric conversion unit and the first holding unit, a second transfer switch provided between the photoelectric conversion unit and the second holding unit, a third transfer switch provided between the first holding unit and the amplification unit, and a fourth transfer switch provided between the second holding unit and the amplification unit. By being controlled to be on, the first transfer switch transfers, from the photoelectric conversion unit to the first holding unit, first actual signal charges accumulated in the photoelectric conversion unit in a first exposure period of one frame. By being controlled to be on, the second transfer switch transfers, from the photoelectric conversion unit to the second holding unit, second actual signal charges accumulated in the second exposure period after the first exposure period of the one frame. By being controlled to be on after the first exposure period, the third transfer switch transfers, to the amplification unit, the first actual signal charges transferred to the first holding unit and first false signal charges accumulated in the first holding unit. By being controlled to be on after the second exposure period, the fourth transfer switch transfers, to the amplification unit, the second actual signal charges transferred to the second holding unit and second false signal charges accumulated in the second holding unit.

Further features of the present invention will become apparent from the following description of exemplary embodiments with reference to the attached drawings.

DESCRIPTION OF THE EMBODIMENTS

Figure 1:
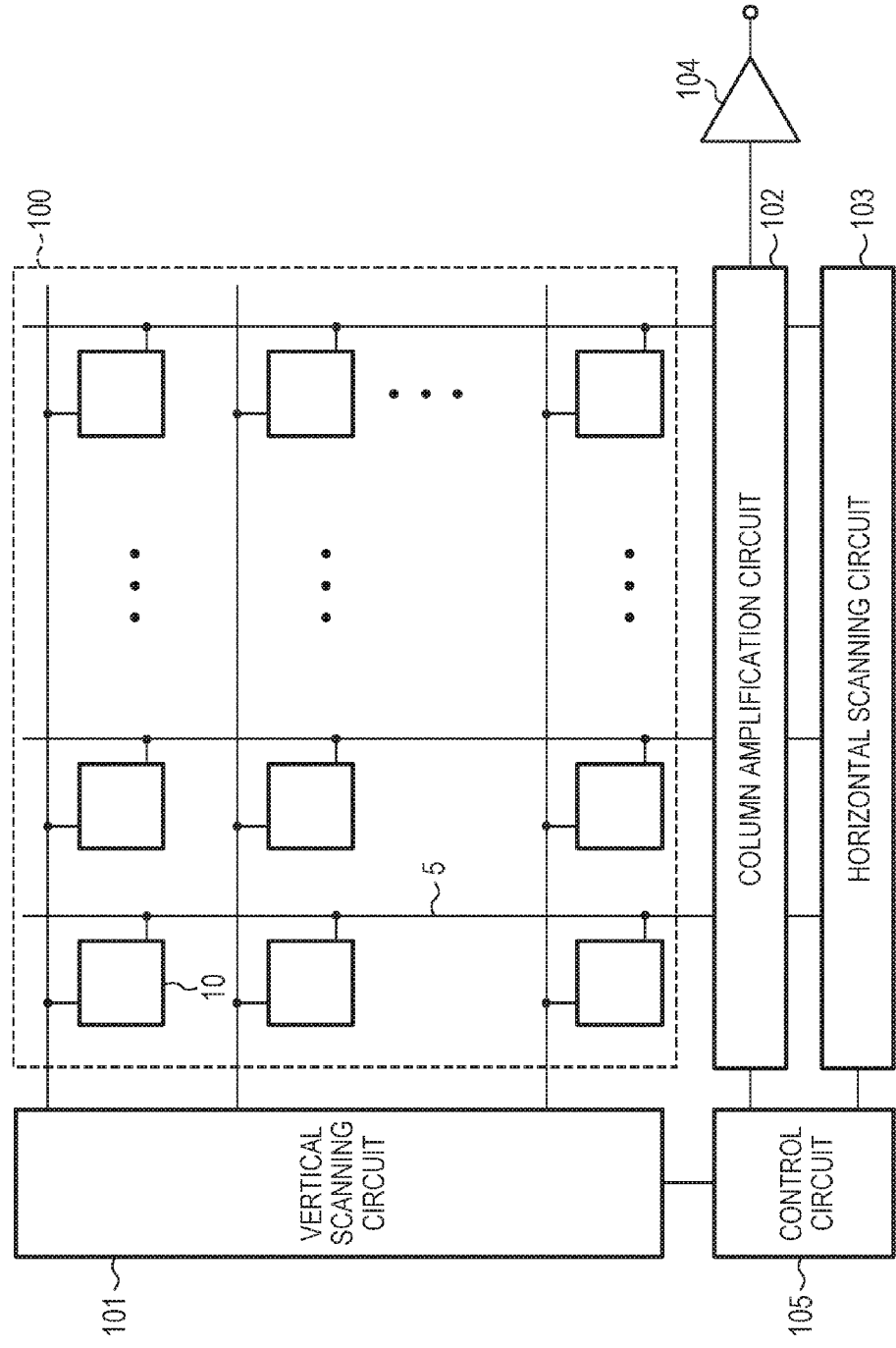
FIG. 1 is a block diagram illustrating a general configuration of an imaging device according to a first embodiment of the present invention.

An imaging device according one embodiment of the present invention includes a plurality of pixels, and each of the pixels has a photoelectric conversion unit, a first holding unit and a second holding unit that are provided associated with the photoelectric conversion unit and hold signal charges, and an amplification unit that outputs a signal based on charges. Furthermore, each pixel has a first transfer transistor provided between the photoelectric conversion unit and the first holding unit and a second transfer transistor provided between the photoelectric conversion unit and the second holding unit. Furthermore, each pixel has a third transfer transistor provided between the first holding unit and the amplification unit, a fourth transfer transistor provided between the second holding unit and the amplification unit, and an overflow transistor that drains charges of the photoelectric conversion unit. Such a configuration enables so-called global electronic shutter operation, namely, capturing operation in which periods of photoelectric conversion are matched among a plurality of pixels. Electronic shutter refers to capturing operation that electrically controls the timing of accumulation of signal charges generated from an incident light.

By a plurality of first transistors being simultaneously turned on before a first readout period of respective frames, actual signal charges accumulated in the photoelectric conversion units of respective pixels are transferred to the first holding units. Then, by a plurality of third transfer transistors being sequentially turned on, the actual signal charges of the previous frame and first false signal charges accumulated in the first holding units are sequentially transferred from the first holding units to the amplification units (first readout). Each of the first holding units that have completed such transfer restarts accumulating the first false signal charges and enters a standby state for transfer of the actual signal charges from each of the first transfer transistors. Here, during the first readout period, the second transfer transistor remains to be turned off. Since the actual signal charges accumulated in the photoelectric conversion unit are not transferred to the second holding unit, the second holding unit is in a state where only second false signal charges generated by the second holding unit are accumulated.

In a second readout period after the end of the first readout period, by a plurality of fourth transfer transistors being sequentially turned on, accumulation of the second false signal charges by the second holding unit ends and the second false signal charges are sequentially transferred from the second holding units to the amplification units (second readout). Each of the second holding units that have completed such transfer restarts accumulating the second false signal charges corresponding to the next frame.

Signal processing such as a differential process is performed by using a first signal based on the actual signal charges and the first false signal charges output from the first holding unit and a second signal based on the second false signal charges output from the second holding unit, and thereby influence of the false signal charges can be reduced. That is, an accurate image corresponding to the actual signal charges can be obtained.

Note that the operation timing of the present embodiment has the first readout period and the second readout period corresponding to each frame. Here, the number of signals output in the first readout period and the second readout period may vary according to the form of an output image (moving image, static image, or the like). For example, when a moving image is captured, signals corresponding to the number of horizontal lines used in one frame may be output. Note that it is not essential that signals be output from all the pixels included in the imaging device, and a readout method in which signals are output from pixels only on a part of the rows or a part of the columns may be employed, for example.

It is here desirable for the first holding unit and the second holding unit to have the same configuration of the holding units such as the electrode structure of the holding unit, impurity implanting performed on the holding unit, or the positional relationship of the holding unit relative to the photoelectric conversion unit, for example, as much as possible. In this case, false signal charges generated in the first holding unit and false signal charges generated in the second holding unit become substantially the same, which can further reduce false signal charges after processing and allows for acquisition of an accurate actual signal. Note that it is not essential for the first holding unit and the second holding unit to have the same design, structure, or the like, and it is possible to reduce the area of the second holding unit compared to the first holding unit and interpolate and use the difference in the area by calculation, for example. Since the area of the second holding unit can be reduced, the area corresponding to the reduced area can be allocated to the first holding unit, which allows for an increased saturation charge amount.

Further, a kTC noise can be reduced by acquiring in advance output signals of the amplification units before sequentially turning on the third transfer transistors or the fourth transfer transistors.

An imaging system using the imaging device according to some embodiments of the present invention can reduce influence of the false signal charges by using a signal containing false signal charges acquired from the imaging device for correction. Therefore, a decrease in the image quality due to false signal charges can be reduced, and thus an imaging system that can obtain an accurate image while implementing global electronic shutter operation is provided.

An imaging device according to one embodiment of the present invention continuously performs a first readout and a second readout on pixels on the same row, in which the first readout reads out a first signal based on actual signal charges and first false signal charges, and the second readout reads out a second signal based on second false signal charges. Since the first signal and the second signal for one row can be continuously acquired, it is not necessary to separately hold signals of respective frames in a frame memory or the like, which allows for a simplified configuration of an imaging system.

Preferred embodiments of the present invention will now be described in detail in accordance with the accompanying drawings. The present invention is not limited to the embodiments, and some configuration of any of the embodiments may be added and combined to another embodiment or may be replaced with some configuration of another embodiment, for example.

First Embodiment

FIG. 1 is a block diagram illustrating a general configuration of an imaging device according to the present embodiment. The imaging device has a pixel unit 100, a vertical scanning circuit 101, a column amplification circuit 102, a horizontal scanning circuit 103, an output circuit 104, and a control circuit 105. The pixel unit 100 has a plurality of pixels 10 arranged to form a plurality of rows and columns. The vertical scanning circuit 101 supplies control signals for controlling a plurality of transistors included in the pixel 10 to be on (conductive state) or off (non-conductive state). A column signal line 5 is provided on each column of the pixels 10, and signals from the pixels 10 are read out to the column signal lines 5 on a column basis. The column amplification circuit 102 amplifies pixel signals output to the column signal lines 5 and performs a process thereon such as correlated double sampling or the like based on signals at the time of reset and signals at the time of photoelectric conversion of the pixels 10. The horizontal scanning circuit 103 has switches connected to amplifiers of the column amplification circuit 102 and supplies control signals to control the switches to be on or off. The output circuit 104 is formed of a buffer amplifier, a differential amplifier, or the like, and outputs a pixel signal from the column amplification circuit 102 to a signal processing unit outside the imaging device. Note that the column amplification circuit 102 inside the imaging device may include a function of a signal processing circuit that performs signal processing such as correction of a false signal component. In addition, an analog-to-digital conversion (AD conversion) unit may be further provided to the imaging device, and the imaging device may be configured to output a digital pixel signal.

Figure 2:
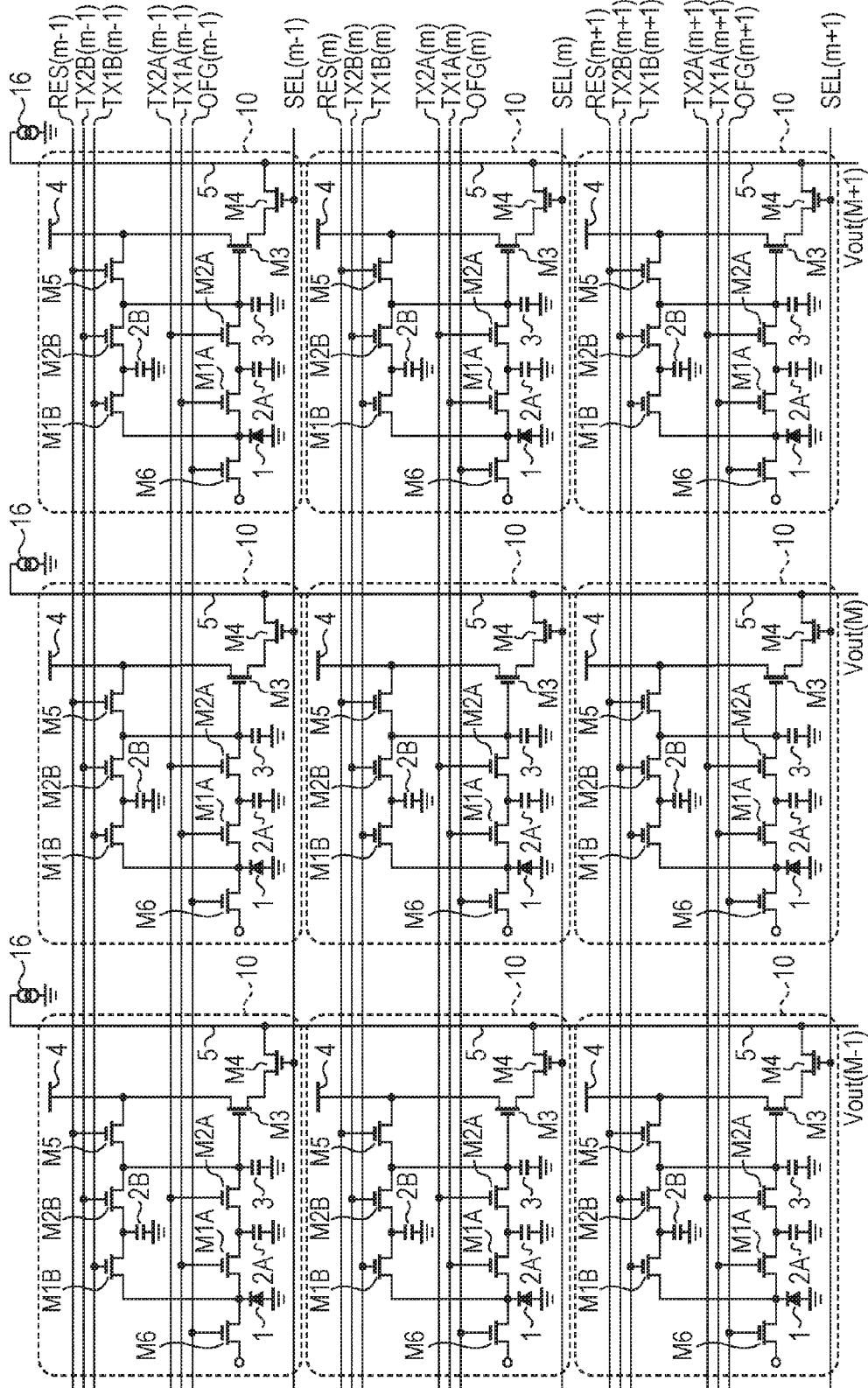
FIG. 2 is a diagram illustrating an equivalent circuit of pixels of the imaging device according to the first embodiment of the present invention.

FIG. 2 illustrates an equivalent circuit of pixels 10 in the imaging device according to the present embodiment. FIG. 2 illustrates nine pixels 10 of three rows by three columns out of the multiple pixels 10 two-dimensionally aligned in the row direction and the column direction. However, this is a mere example illustrating a part of the multiple pixels 10, and the imaging device may have more pixels. Each pixel 10 has a photoelectric conversion unit 1, a first holding unit 2A, a second holding unit 2B, a floating diffusion unit 3, a first transfer transistor M1A, a second transfer transistor M1B, a third transfer transistor M2A, and a fourth transfer transistor M2B. Furthermore, each pixel 10 has an amplification transistor M3, a selection transistor M4, a reset transistor M5, and an overflow transistor M6.

The photoelectric conversion unit 1 photoelectrically converts an incident light and accumulates signal charges generated by the photoelectric conversion. The first transfer transistor M1A (first transfer switch) is provided between the photoelectric conversion unit 1 and the first holding unit 2A and, when turned on, transfers signal charges of the photoelectric conversion unit 1 to the first holding unit 2A. The second transfer transistor M1B (second transfer switch) is provided between the photoelectric conversion unit 1 and the second holding unit 2B and, when turned on, transfers signal charges of the photoelectric conversion unit 1 to the second holding unit 2B. The first holding unit 2A and the second holding unit 2B hold signal charges transferred from the photoelectric conversion unit 1. The third transfer transistor M2A (third transfer switch) is provided between the first holding unit 2A and the floating diffusion unit 3 of the amplification transistor M3 and, when turned on, transfers charges of the first holding unit 2A to the floating diffusion unit 3 of the amplification transistor M3. The fourth transfer transistor M2B (fourth transfer switch) is provided between the second holding unit 2B and the floating diffusion unit 3 of the amplification transistor M3 and, when turned on, transfers charges of the second holding unit 2B to the floating diffusion unit 3 of the amplification transistor M3. The drain of the amplification transistor M3 is connected to a power supply voltage line 4, and the source is connected to the column signal line 5 via the selection transistor M4. A constant current source 16 is connected to the column signal line 5. The output signal Vout is output to the column amplification circuit 102 via the column signal line 5 on each column. When turned on, the reset transistor M5 (reset switch) resets the voltage of the floating diffusion unit 3. The source of the overflow transistor M6 (drain switch) is connected to the photoelectric conversion unit 1, the drain is connected to the power supply node, and the control signal OFG is applied to the gate. When the overflow transistor M6 is turned on, charges of the photoelectric conversion unit 1 can be drained to an overflow drain such as a power supply node. Accumulation of charges by the photoelectric conversion unit 1 is started by controlling the overflow transistor M6 to be off from an on-state. Thereby, any length of an exposure period can be set.

In the following description, the floating diffusion unit 3, the amplification transistor M3, the selection transistor M4, and the reset transistor M5 may be collectively referred to as an output unit. Further, the floating diffusion unit 3 and the amplification transistor M3 function as an amplification unit that outputs a voltage based on transferred charges. Signal charges obtained by photoelectric conversion in the photoelectric conversion unit 1 from an incident light are referred to as actual signal charges. On the other hand, charges of a noise component such as charges caused by leakage of charges, and charges caused by photoelectric conversion at portions other than the photoelectric conversion unit 1, which may be the first holding unit 2A and the second holding unit 2B, for example, are referred to as false signal charges, and description thereof will be provided with distinction from the above-described actual signal charges. False signal charges generated in the first holding unit 2A may be referred to as first false signal charges, and false signal charges generated in the second holding unit 2B may be referred to as second false signal charges.

Note that a signal of the floating diffusion unit 3 may be read out without providing the selection transistor M4. Further, it is not essential to provide the overflow transistor M6, and thus the overflow transistor M6 may be omitted. When the overflow transistor M6 is omitted, accumulation of charges by the photoelectric conversion unit 1 is started by controlling the first transfer transistor M1A to be turned off from an on-state, for example, and thereby the length of an exposure period can be set. In this configuration, although there is a constraint in the operation method of each transistor for setting the length of an exposure period, the number of components is reduced and therefore the flexibility of the layout is improved.

Further, as another modified example, a configuration called vertical overflow in which charges from a photoelectric conversion unit are transferred to a semiconductor substrate may be employed. In this configuration, the number of components arranged on the substrate surface is reduced and therefore the flexibility of the layout is improved.

A common control signal is supplied from the vertical scanning circuit 101 to the pixels 10 arranged on the same row. That is, a control signal TX1A(m) is supplied to the gate of the first transfer transistor M1A included in each of the plurality of pixels 10 arranged on the m-th row. Similarly, a control signal TX1B(m) is supplied to the gate of the second transfer transistor M1B on the m-th row. A control signal TX2A(m) is supplied to the gate of the third transfer transistor M2A on the m-th row. A control signal TX2B(m) is supplied to the gate of the fourth transfer transistor M2B on the m-th row. A control signal SEL(m) is supplied to the gate of the selection transistor M4 on the m-th row. A control signal RES(m) is supplied to the gate of the reset transistor M5 on the m-th row. A control signal OFG(m) is supplied to the gate of the overflow transistor M6 on the m-th row. Note that the index m of each control signal denotes a row number. In the present specification, while the index is provided when it is necessary to express that a control signal is associated with a particular row, the index may otherwise be omitted.

Each of these transistors is in an on-state when each corresponding control signal is high level and is in an off-state when each corresponding control signal is low level. By controlling the control signals on respective rows to be on or off at the same time, it is possible to control the imaging device such that the plurality of pixels 10 have the same exposure period. Such a configuration allows the photoelectric conversion unit 1 to accumulate newly generated charges during the first holding unit 2A and the second holding unit 2B holding charges, which enables global electronic shutter operation that causes the periods of photoelectric conversion in the plurality of pixels to be matched.

Note that, although each of the plurality of pixels 10 has an amplification unit in the circuit of FIG. 2, a single amplification unit may be shared by a plurality of pixels 10. Further, the pixel unit 100 may include, other than effective pixels such as the pixels 10 of FIG. 2, pixels that do not output any signal for configuring an image, such as a light shielding pixel in which the photoelectric conversion unit 1 is shielded, a dummy pixel that has no photoelectric conversion unit 1, or the like.

Figure 3:
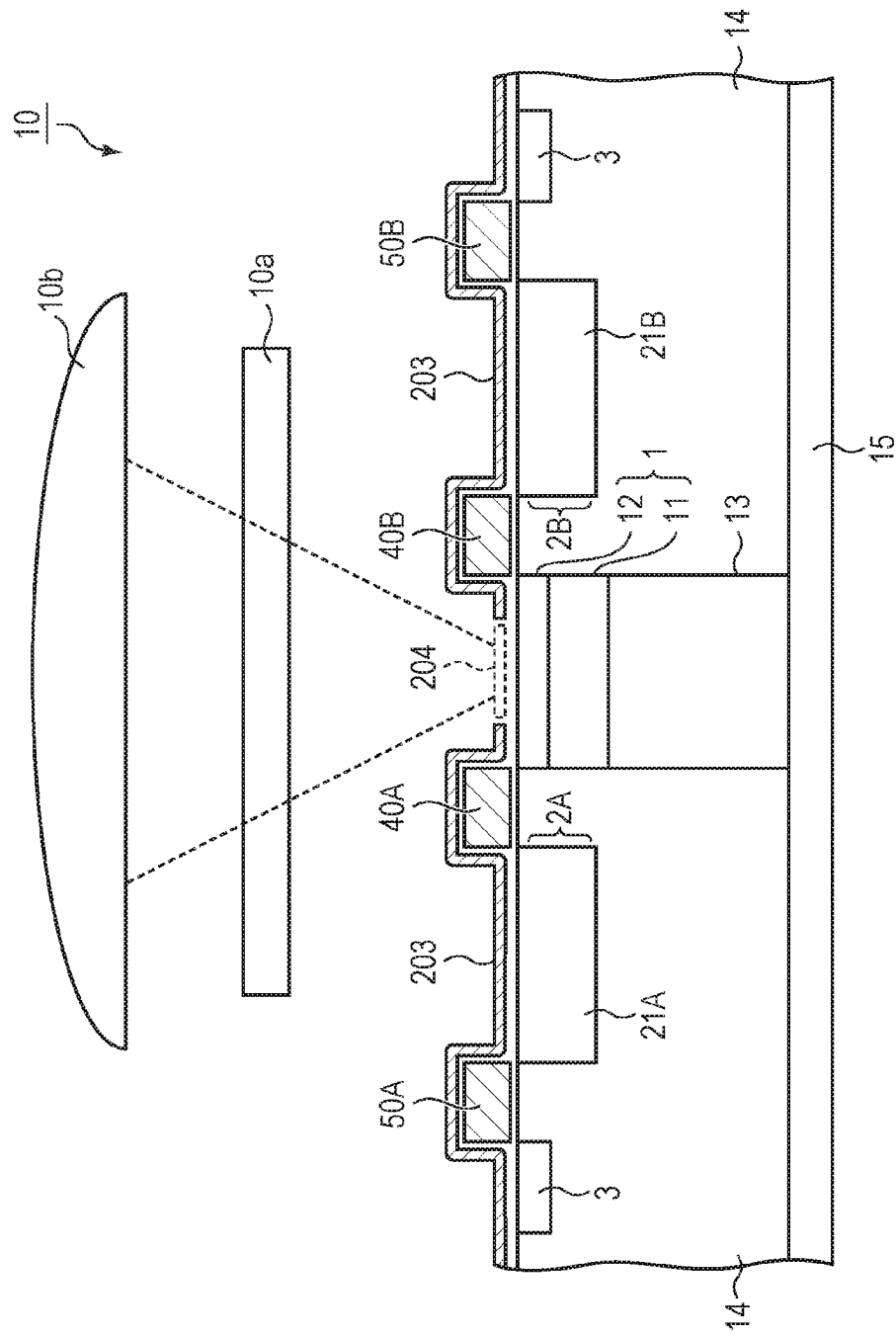
FIG. 3 is a diagram schematically illustrating sectional structure of a pixel of the imaging device according to the first embodiment of the present invention.

FIG. 3 is a diagram schematically illustrating the sectional structure of the pixel 10 in the imaging device according to the present embodiment.

The photoelectric conversion unit 1 is disposed in a P-type well region 14 and has an N-type semiconductor region 11 and a P-type semiconductor region 12. The semiconductor region 11 and the semiconductor region 12 form a PN junction and form buried photodiode structure. An incident light is photoelectrically converted in the PN junction, and charges generated by the photoelectric conversion are accumulated in the N-type semiconductor region 11. At this time, since a PN junction interface is buried in the substrate by the P-type semiconductor region 12, a noise is reduced.

An N-type semiconductor region 13 is disposed on the underside of the photoelectric conversion unit 1. The impurity concentration of the semiconductor region 13 is lower than the impurity concentration of the semiconductor region 11, which is of the same N-type. Thereby, charges generated at a deep position inside the semiconductor substrate are trapped in the semiconductor region 13, and a noise is reduced. The semiconductor region 13 may be of P-type. Furthermore, a P-type semiconductor region 15 that serves as a potential barrier against charges is disposed on the underside of the semiconductor region 13.

The first holding unit 2A and the second holding unit 2B have N-type semiconductor regions 21A and 21B, respectively, disposed in the P-type well region 14. Charges transferred from the photoelectric conversion unit 1 are held in the semiconductor region 21A or 21B. In the present embodiment, the impurity concentrations of the semiconductor regions 21A and 21B are higher than the impurity concentration of the semiconductor region 11 that is of the same N-type.

A gate electrode 40A is disposed over the well region 14 between the semiconductor region 12 and the semiconductor region 21A via a gate insulating film and forms the gate of the first transfer transistor M1A. A gate electrode 40B is disposed over the well region 14 between the semiconductor region 12 and the semiconductor region 21B via the gate insulating film and forms the gate of the second transfer transistor M1B. When each voltage of the gate electrodes 40A and 40B is above a predetermined threshold, the first transfer transistor M1A and the second transfer transistor M1B are in an on-state. At this time, the first transfer transistor M1A transfers charges accumulated in the photoelectric conversion unit 1 to the first holding unit 2A, and the second transfer transistor M1B transfers charges accumulated in the photoelectric conversion unit 1 to the second holding unit 2B. On the other hand, when each voltage of the gate electrodes 40A and 40B is below the predetermined threshold, the first transfer transistor M1A and the second transfer transistor M1B are in an off-state.

A gate electrode 50A is disposed over the well region 14 between the semiconductor region 21A and the floating diffusion unit 3 via the gate insulating film and forms the gate of the third transfer transistor M2A. A gate electrode 50B is disposed over the well region 14 between the semiconductor region 21B and the floating diffusion unit 3 via the gate insulating film and forms the gate of the fourth transfer transistor M2B. When each voltage of the gate electrodes 50A and 50B is above a predetermined threshold, the third transfer transistor M2A and the fourth transfer transistor M2B are in an on-state. At this time, the third transfer transistor M2A transfers charges of the first holding unit 2A to the floating diffusion unit 3, and the fourth transfer transistor M2B transfers charges of the second holding unit 2B to the floating diffusion unit 3. On the other hand, when each voltage of the gate electrodes 50A and 50B is below the predetermined threshold, the third transfer transistor M2A and the fourth transfer transistor M2B are in an off-state. Further, by applying a negative voltage to the gate electrodes 40A, 40B, 50A, and 50B, holes can be induced around the surface under the gate electrodes. Thereby, a noise generated at the interface can be reduced.

Here, when the first transfer transistor M1A and the second transfer transistor M1B are in an on-state, leakage of charges respectively from the semiconductor regions 21A and the semiconductor regions 21B may cause a small noise. On the other hand, when the first transfer transistor M1A and the second transfer transistor M1B are in an off-state, since holes are induced on the surfaces of the semiconductor regions 21A and the semiconductor regions 21B, respectively, the above noise is reduced. Therefore, it is preferable for the first transfer transistor M1A and the second transfer transistor M1B to be controlled to have a short an on-period as much as possible.

The light shielding unit 203 is formed of a metal that is less likely to transmit a visible light, such as tungsten, aluminum, or the like, for example, and shields the semiconductor region including the first holding unit 2A and the second holding unit 2B. The light shielding unit 203 has an opening 204 over the photoelectric conversion unit 1. A color filter 10a that passes a particular wavelength range of the visible light and a micro lens 10b that converges an incident light are disposed over the opening 204.

Note that, although not depicted, the reset transistor M5, the overflow transistor M6, and the like may be disposed on the same substrate as the photoelectric conversion unit 1 and the like. For example, the reset transistor M5, the overflow transistor M6, and the like may be disposed in a depth direction or the like of FIG. 3. Although represented as two components in FIG. 3, the floating diffusion regions 3 are electrically connected and can be equivalently expressed as a single component as illustrated in FIG. 2. Further, although FIG. 3 illustrates the pixel 10 of a front side illumination type as an example of the structure of the pixel 10, the pixel 10 may be of a backside illumination type. Further, although formed on the P-type well region 14, the first holding unit 2A and the second holding unit 2B may be formed on an N-type well region. In this case, N-type and P-type are exchanged, holes instead of electrons are held in the first holding unit 2A and the second holding unit 2B. Further, high level and low level of each control signal supplied to the pixel 10 are inversed.

Figure 4:
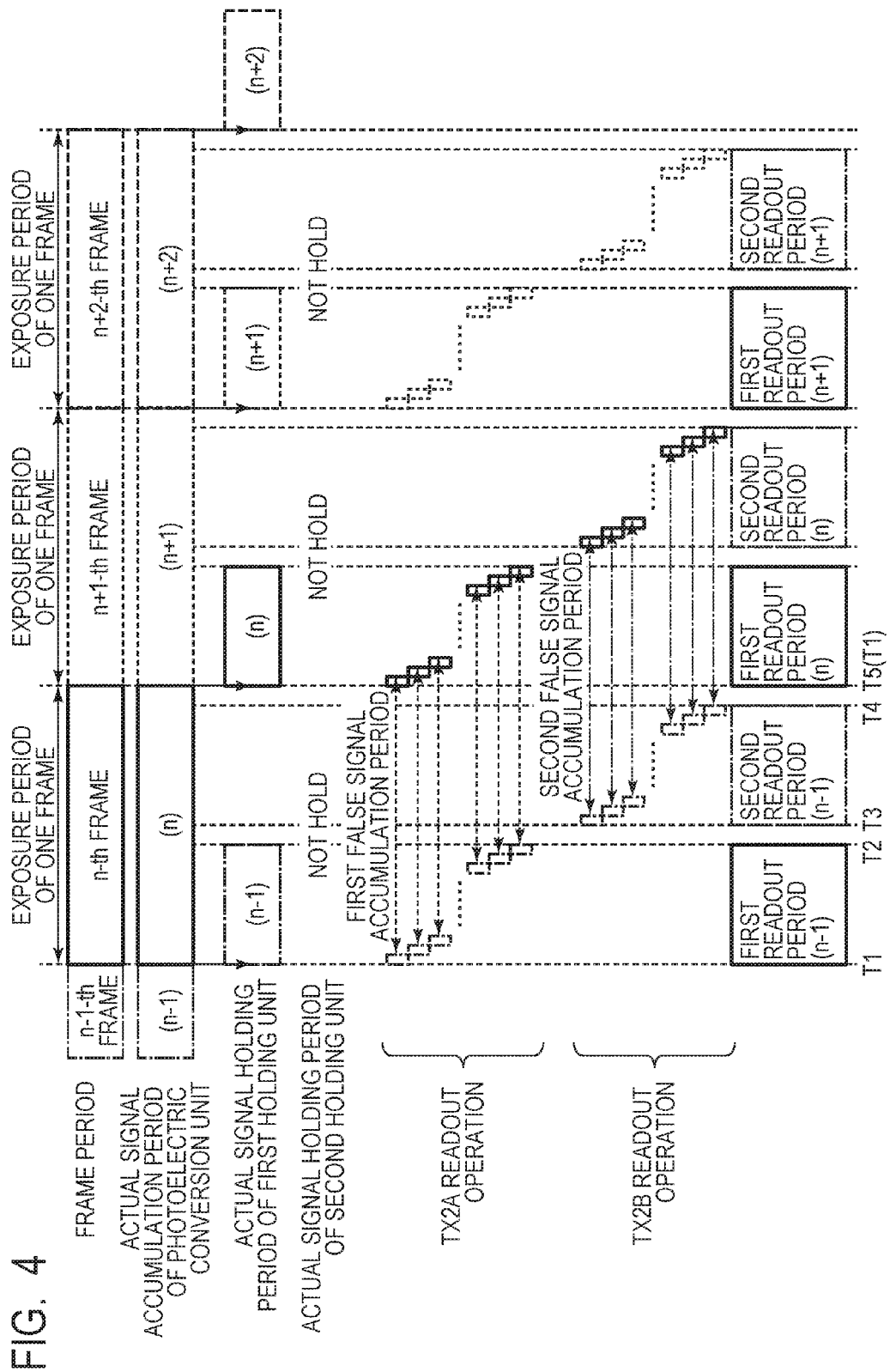
FIG. 4 is a diagram schematically illustrating operation of the imaging device according to the first embodiment of the present invention.

FIG. 4 is a diagram schematically illustrating the operation of the imaging device according to the present embodiment, which mainly illustrates exposure operation from the n-th frame to the n+2-th frame and readout operation from the n-1-th frame to the n+1-th frame.

FIG. 4 schematically illustrates a frame period, an actual signal accumulation period of the photoelectric conversion unit 1, an actual signal holding period of the first holding unit 2A, an actual signal holding period of the second holding unit 2B, a first readout period, a second readout period, and so on. The first readout period corresponds to a period of readout from the first holding unit 2A to the floating diffusion unit 3. The second readout period corresponds to a period of readout from the second holding unit 2B to the floating diffusion unit 3. In FIG. 4, "FRAME PERIOD" represents periods for acquiring an image of each frame forming a moving image. In FIG. 4, "ACTUAL SIGNAL ACCUMULATION PERIOD OF PHOTOELECTRIC CONVERSION UNIT" represents periods in each of which the photoelectric conversion unit 1 generates and accumulates charges based on an incident light. In FIG. 4, "TX2A READOUT OPERATION" represents periods in which the control signals TX2A(m) from the vertical scanning circuit 101 sequentially become high level from the first row, that is, periods in which the third transfer transistors M2A are turned on. In FIG. 4, "TX2B READOUT OPERATION" represents periods in which the control signals TX2B(m) from the vertical scanning circuit 101 sequentially become high level from the first row, that is, periods in which the fourth transfer transistors M2B are turned on. In FIG. 4, "FIRST READOUT PERIOD" and "SECOND READOUT PERIOD" each represent a period in which readout operation of pixel is sequentially performed by scan from the vertical scanning circuit 101. Readout operation here refers to operation including transfer of charges by the third transfer transistor M2A and the fourth transfer transistor M2B and output operation of signals by the amplification transistor M3 and the selection transistor M4.

At the time T1, the actual signal charges generated in the photoelectric conversion unit 1 during the n-1-th frame and the first false signal charges generated on and after the first readout period of the n-1-th frame have been accumulated in the first holding unit 2A. Furthermore, the second false signal charges generated on and after the second readout period of the n-1-th frame have been accumulated in the second holding unit 2B.

Subsequently, during the first readout period between the time T1 to the time T2, the vertical scanning circuit 101 sequentially scans respective rows. In response to the scan by the vertical scanning circuit 101, the column amplification circuit 102 sequentially outputs pixel signals based on the actual signal charges held in the first holding unit 2A and the first false signal charges held in the first holding unit 2A. Upon the end of output of pixel signals from the first holding units 2A on respective rows, the first false signal accumulation periods are sequentially started.

At the time when the first readout period has elapsed from the time T1, that is, at the time T2, readout of pixel signals of the n-1-th frame is completed. Subsequently, during the second readout period from the time T3 to the time T4, the vertical scanning circuit 101 again sequentially scans respective rows. In response to the scan by the vertical scanning circuit 101, the column amplification circuit 102 sequentially outputs pixel signals based on the second false signal charges held in the second holding unit 2B. Upon the end of output of pixel signals from the second holding units 2B on respective rows, the second false signal accumulation periods are sequentially started.

In parallel to the above operation, the photoelectric conversion unit 1 performs charge accumulation in an actual signal accumulation period (n) of the n-th frame. That is, the first readout and the second readout described above are performed in parallel to the accumulation of charges in the photoelectric conversion unit 1 as illustrated in FIG. 4. The length of an exposure period may be increased or decreased in accordance with capturing conditions such as the brightness of an object or the like and, in this case, it is not essential for both the first readout and the second readout to be performed in parallel to the accumulation of charges in the photoelectric conversion unit 1. That is, only one of the first readout and the second readout may be performed in parallel to the accumulation of charges, and the accumulation of charges in the photoelectric conversion unit 1 may be started after the end of the first readout and the second readout.

Then, the first transfer transistor M1A is turned on immediately before the time T5, and the first transfer transistor M1A is turned off at the time T5. Thereby, charges accumulated in the photoelectric conversion unit 1 during an exposure period of one frame are transferred to the first holding unit 2A, and the actual signal accumulation period (n) of the n-th frame ends. The first holding unit 2A holds actual signal charges generated in the photoelectric conversion unit 1 during the n-th frame and false signal charges generated in the first false signal accumulation period of the n-th frame. Furthermore, the second holding unit 2B holds second false signal charges generated in the second false signal accumulation period of the n-th frame.

Subsequently, in a similar manner, capturing operations of the n+1-th frame, the n+2-th frame, . . . , are repeatedly performed. Note that, although there is a period for resetting the photoelectric conversion unit 1 between two exposure periods in the actual operation, such a period is not shown in FIG. 4. That is, although FIG. 4 illustrates as if the time T5 at the end of the n-th frame matched the time T1 of the next n+1-th frame, there is a period for turning on the overflow transistor M6 and then turning it off between these times in the actual operation. Since this period is short, however, an exposure period of the next frame can be started shortly after the end of a one-frame exposure. Therefore, according to the configuration of the present embodiment, a period in which no exposure is made, that is, a period in which image information is missed can be reduced, which allows for global electronic shutter operation with an improved image quality.

Note that, although readout is sequentially performed from the first row in FIG. 4, the order of readout is not limited thereto. In each of the first and second readout periods, the order of readout is not limited as long as at least one time of readout is performed for each pixel.

Figure 5:
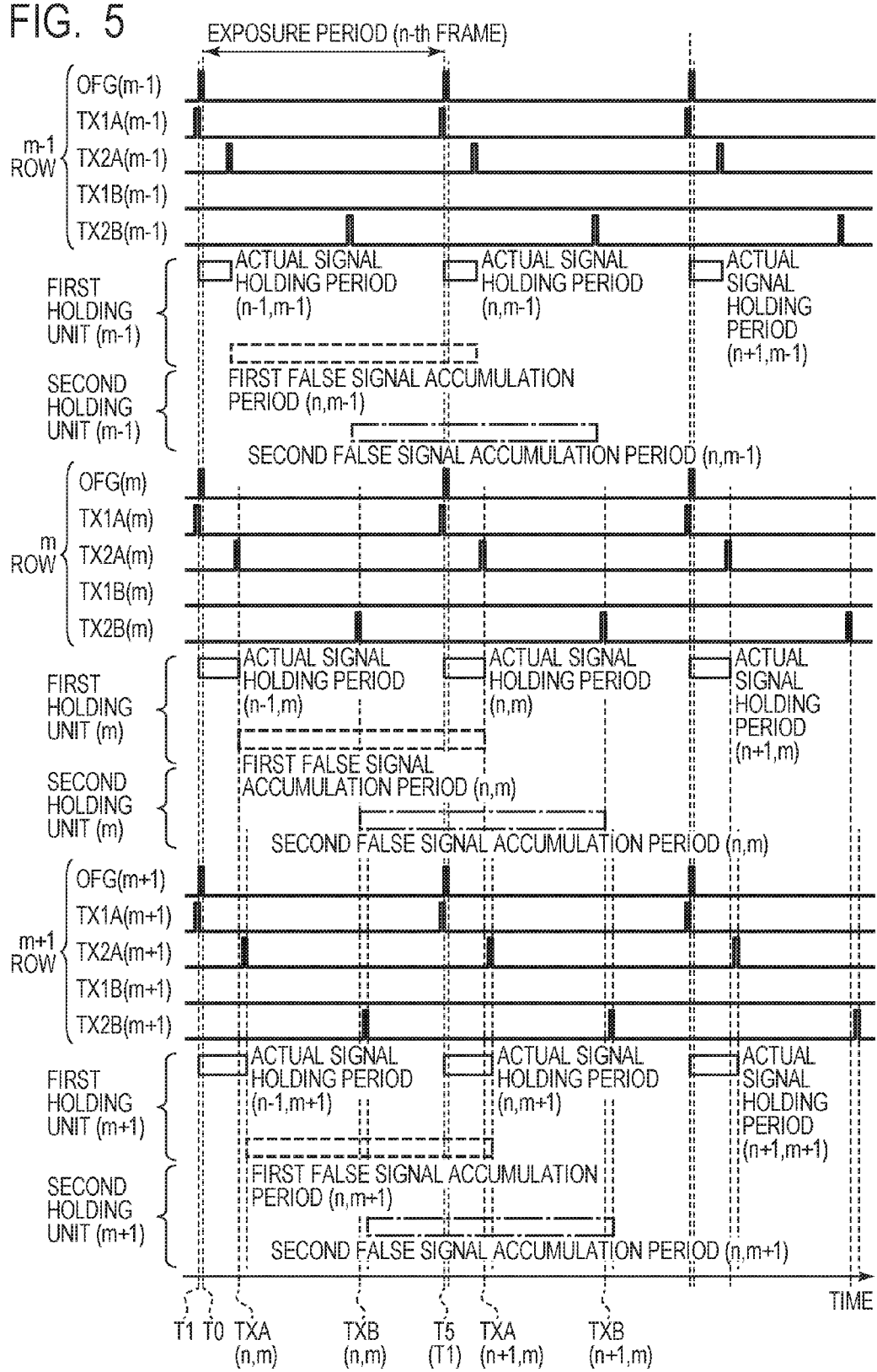
FIG. 5 is a timing chart of control signals of the imaging device according to the first embodiment of the present invention.

FIG. 5 is a timing chart of the imaging device according to the present embodiment and illustrates the control signals OFG, TX1A, TX1B, TX2A, and TX2B of the m−1-th to m+1-th rows. As described above, the control signal OFG is a signal applied to the gate of the overflow transistor M6. Furthermore, the control signals TX1A, TX1B, TX2A, and TX2B are signals applied to the gate of the first transfer transistor M1A, the gate of the second transfer transistor M1B, the gate of the third transfer transistor M2A, and the gate of the fourth transfer transistor M2B, respectively. When the control signal is high level, the corresponding transistor will be in an on-state, and when the control signal is low level, the corresponding transistor will be in an off-state. Note that, although FIG. 5 illustrates only the control signals of the m−1-th to m+1-th rows, other rows are sequentially driven in the same manner.

Two indices are provided here to the actual signal holding period, the first false signal accumulation period, and the second false signal accumulation period in FIG. 4. The first index denotes a frame number corresponding to the signal in interest. The second index denotes a row number. For example, the actual signal holding period (n, m) represents a period in which the n-th frame signal for the pixel 10 on the m-th row is held in the first holding unit 2A. As described above, since readout of the n-th frame signal may be performed in parallel to the n+1-th frame exposure, at least a part of the actual signal holding period (n, m) may overlap with the n+1-th frame period.

With reference to FIG. 4 and FIG. 5, the operation timing of the imaging device according to the present embodiment will be described in detail. At the time before the time T1, the control signal TX1A on each row becomes high level, and the first transfer transistor M1A included in each of the plurality of pixels 10 is turned on at the same time. This operation causes charges accumulated in the n−1-th frame to be transferred from the photoelectric conversion unit 1 to the first holding unit 2A as actual signal charges.

At the time T1, the control signal TX1A on each row becomes low level, and the first transfer transistor M1A of each pixel is turned off at the same time. The control signal OFG on each row then becomes high level, and the overflow transistor M6 is turned on. This operation causes charges accumulated in the photoelectric conversion unit 1 and residual charges in the photoelectric conversion unit 1 to be drained. Then, at the time T0 that is the start time of the next frame exposure, the control signal OFG on each row becomes low level, and the overflow transistor M6 is turned off. From the time T0, the photoelectric conversion unit 1 starts accumulation of charges, and the actual signal accumulation period (n) is started. The time T0 when exposure starts can be properly set by controlling the timing at which the overflow transistor M6 transitions from an on-state to an off-state. Note that the timing at which the overflow transistor M6 transitions from an on-state to an off-state may occur before the timing at which the first transfer transistor M1A of each pixel is turned off. In this case, the time when an exposure period of the first frame starts is the time when the first transfer transistor M1A is turned off.

In a period from the time T1 to T2, that is, in the first readout period, the control signals TX2A(1), . . . , TX2A(m−1), TX2A(m), TX2A(m+1), . . . sequentially become high level, and the third transfer transistors M2A are sequentially turned on. This operation causes charges accumulated in the first holding units 2A in the n−1-th frame to be sequentially read out to the floating diffusion units 3. Note that, in FIG. 5, the time when the third transfer transistor M2A on the m-th row is again turned off after being turned on by the control signal TX2A(m) is denoted with a frame number and a row number such as the time TXA(n, m), for example.

The control signal OFG is maintained in low level from the start time T0 of an exposure period of one frame to the start time T5 of the next frame period. That is, the overflow transistor M6 is maintained in an off-state during a period from the time T0 to the time T5. A period in which the overflow transistor M6 is maintained in an off-state corresponds to an exposure period of the n-th frame. During this exposure period, charges are continued to be accumulated in the photoelectric conversion unit 1. Further, during this period, that is, during a period in which charges are accumulated in the photoelectric conversion unit 1, the control signal TX1B is maintained in low level, and the second transfer transistor M1B is maintained to be off. Note that, as illustrated in FIG. 5, the second transfer transistor M1B may be maintained to be off throughout the entire period including a period in which the overflow transistor M6 is in an on-state.

At the time T2, the first readout period of reading out the actual signal and the first false signal charges ends. Then, in a period from the time T3 to the time T4 (second readout period), the vertical scanning circuit 101 sequentially scans respective rows again. Specifically, in a similar manner to the first readout period described above, the control signals TX2B(1), . . . , TX2B(m−1), TX2B(m), TX2B(m+1), . . . sequentially become high level, and the fourth transfer transistors M2B are sequentially turned on. This operation causes the column amplification circuit 102 to sequentially output pixel signals based on the false signal charges accumulated in the second holding unit 2B during the second false signal accumulation period in which the second transfer transistor M1B is maintained to be off. Upon the end of output by the second holding unit 2B on each row, the second false signal accumulation periods are sequentially started on a row basis. Note that, in FIG. 5, the time when the fourth transfer transistor M2B on the m-th row is again turned off after being turned on by the control signal TX2B(m) is denoted with a frame number and a row number such as the time TXB(n, m), for example.

The control signal TX1A then becomes high level immediately before the time T5, and the first transfer transistor M1A is turned on. Furthermore, at the time T5, the control signal TX1A becomes low level, and the first transfer transistor M1A is turned off. This operation causes charges accumulated in the photoelectric conversion unit 1 to be transferred to the first holding unit 2A, and the actual signal accumulation period (n) of the n-th frame ends. At this time, the first holding unit 2A holds actual signal charges generated in the photoelectric conversion unit 1 in the n-th frame and charges based on the first false signal charges generated in the first false signal accumulation period of the n-th frame. The second holding unit 2B holds the second false signal charges generated in the second false signal accumulation period of the n-th frame.

The same operation as described above is also repeated in each frame on and before the n−1-th frame and on and after the n+1-th frame. The lengths of the first false signal accumulation period and the second false signal accumulation period are substantially the same, which correspond to the length of a one-frame period. That is, the transfer interval of charges from the first holding unit 2A to the floating diffusion unit 3 is substantially the same as the transfer interval of charges from the second holding unit 2B to the floating diffusion unit 3.

Note that the first false signal accumulation period is defined as a period from the time TXA(n, m) when the third transfer transistor M2A is turned off in a certain frame (assumed as the n-th frame) to the time TXA(n+1, m) when the third transfer transistor M2A is turned off in the next frame. Further, the second false signal accumulation period is defined as a period from the time TXB(n, m) when the fourth transfer transistor M2B is turned off in a certain frame (assumed as the n-th frame) to the time TXB(n+1, m) when the fourth transfer transistor M2B is turned off in the next frame.

Figure 6:
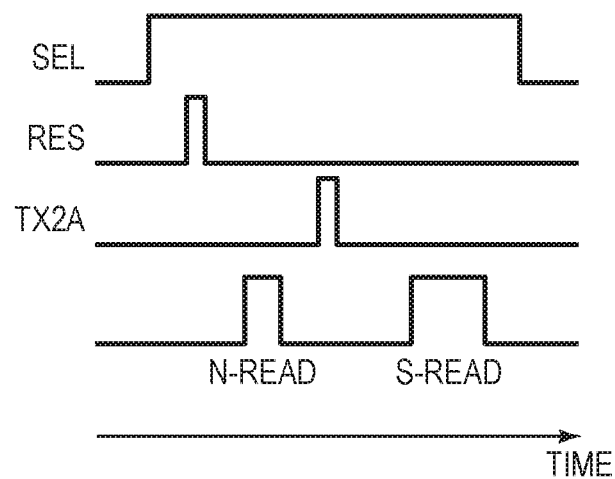
FIG. 6 is a timing chart of a pixel of the imaging device according to the first embodiment of the present invention.

FIG. 6 is a timing chart of control signals according to the present embodiment and represents readout operation of a pixel signal. Readout operation for one row performed in the first readout period will be described below. Readout in the second readout period can be understood by replacing the third transfer transistor M2A, the control signal TX2A, and the first holding unit 2A with the fourth transfer transistor M2B, the control signal TX2B, and the second holding unit 2B, respectively, and thus the description thereof will be omitted.

FIG. 6 illustrates the control signal SEL supplied to the selection transistor M4, the control signal RES supplied to the reset transistor M5, and the control signal TX2A supplied to the third transfer transistor M2A. Each of the third transfer transistor M2A, the selection transistor M4, and the reset transistor M5 is in an on-state when the corresponding control signal is high level, and is in an off-state when the corresponding control signal is low level.

With reference to FIG. 1 and FIG. 6, readout operation of a pixel signal will be described below. First, the vertical scanning circuit 101 turns the control signal SEL to high level to turn on the selection transistor M4 and select the pixel 10 from which a signal is read out. Next, the vertical scanning circuit 101 turns the control signal RES to high level to turn of the reset transistor M5. When the reset transistor M5 is turned on, the voltage of the floating diffusion unit 3 is reset to the power supply voltage. After the reset transistor M5 is turned off, the column amplification circuit 102 performs readout of a pixel signal at the time of reset (N-read) from the column signal line 5. The vertical scanning circuit 101 turns the control signal TX2A to high level to turn on the third transfer transistor M2A and cause charges of the first holding unit 2A to be transferred to the floating diffusion unit 3. The column amplification circuit 102 performs readout of a pixel signal from the column signal line 5 (S-read). The pixel signal read out in such a way is subjected to a correlated double sampling process in the column amplification circuit 102 or otherwise in the output circuit 104 and outputs from the output circuit 104. Note that the pixel signal may be subjected to AD conversion before subjected to the correlated double sampling process.

In the imaging device of the present embodiment, the second transfer transistor M1B is maintained to be off during a period in which charges are accumulated in the photoelectric conversion unit 1. Thus, no transfer of actual signal charges from the photoelectric conversion unit 1 to the second holding unit 2B is performed. Therefore, the second false signal charges only are accumulated in the second holding unit 2B.

Further, the first readout period and the second readout period have substantially the same length, and the sum of the lengths of these two readout periods is substantially the same as the length of a one-frame period. Therefore, when a moving image of 60 frames per second is captured, for example, the first and second readout period will be around $1/120$ seconds, respectively.

Note that the imaging device of the present embodiment may have an operation mode of rolling shutter in addition to the operation mode of global electronic shutter. The rolling shutter is an operation mode that sequentially starts accumulation of charges by the photoelectric conversion units 1 of the pixels 10 on a row basis or otherwise on a multiple-row basis. In this operation mode, the first transfer transistors M1A on respective rows of the pixels 10 are controlled to be on in a sequential manner on a row basis or otherwise on a multiple-row basis.

As described above, according to the present embodiment, a correcting signal corresponding to false signal charges generated in the holding unit can be separately acquired. Therefore, since a false signal component can be corrected by using this correcting signal to perform signal processing such as a differential process, an imaging system that is able to implement global electronic shutter with a reduced noise can be provided.

Influence of false signal charges can be corrected by using a signal read out in the second readout period (second signal) to perform a process for correcting a signal read out in the first readout period (first signal), which allows for a reduction of image quality degradation due to a false signal. A differential process that is an example of this correction method will be specifically described below. Note that the above correction method may be performed in a signal processing unit within an imaging system on which the imaging device is mounted, or may be performed in the column amplification circuit 102 within the imaging device.

Further, this correction method may be performed through digital signal processing on a digital signal resulted after AD conversion, or may be performed on an analog signal obtained before AD conversion by using an operational amplifier or the like.

The level of a signal based on the actual signal charges is denoted as Vr, the level of a signal based on the first false signal charges is denoted as Vf1, and the level of a signal based on the second false signal charges is denoted as Vf2. In this example, the first signal read out in the first readout period is (Vr+Vf1), and the second signal read out in the second readout period is Vf2. In the present embodiment, the length of the first false signal accumulation period and the length of the second false signal accumulation period are substantially the same. Therefore, Vf1 is substantially the same as Vf2. The following equation (1) is therefore established.

$$(Vr+Vf1)-Vf2 \approx Vr \qquad (1)$$

According to the equation (1), a false signal can be corrected by subtracting the second signal Vf2 read out in the second readout period from the first signal (Vr+Vf1) read out in the first readout period. Thereby, the first false signal charges and the second false signal charges are cancelled, and the signal Vr based on the actual signal charges is obtained. While the second signal Vf2 of the same frame may be used for the second signal Vf2 used for subtraction, the second signal Vf2 of a different frame may be used as long as both frames occur within the close time. Further, in the present embodiment, since the second readout period is provided in each frame, the second signal Vf2 of each frame is acquired. However, it is possible to employ a drive method of performing only a single time of acquisition of the second signal Vf2 in a period over a plurality of frames. In other words, the imaging device may be driven such that the frequency of the second signal Vf2 being read out by the fourth transfer transistor M2B is less than the frequency of the first signal (Vr+Vf1) being read out by the third transfer transistor M2A. In this case, for correction of the frame having no second readout period, it is possible to use the second signal Vf2 acquired in a frame before or after the frame having no second readout period. According to this configuration, the frequency of signal readout can be reduced and therefore power consumption can be reduced.

As described above, according to the present embodiment, the imaging device that can acquire a correcting signal of a false signal is provided. Further, according to the present embodiment, by performing a process using the above correcting signal, an imaging device or an imaging system can be provided which is able to acquire an image in which image quality degradation due to a false signal is further reduced. Note that the correction process described above may be performed on a signal obtained by the S-read illustrated in FIG. 6, or may be performed on a signal resulted after a correlated double sampling process.

Second Embodiment

An imaging device according to the second embodiment will be described. In the first embodiment, the first readout period and the second readout period are set in separate periods. In contrast, the present embodiment is different from the first embodiment in that, immediately after the first readout of a row, the second readout of the same row is performed without transfer of another row being performed between the first readout and the second readout in a period for performing readout of each row. The configuration of the present embodiment will be described below with omission or simplification of the configuration similar to that in the first embodiment.

Figure 7:
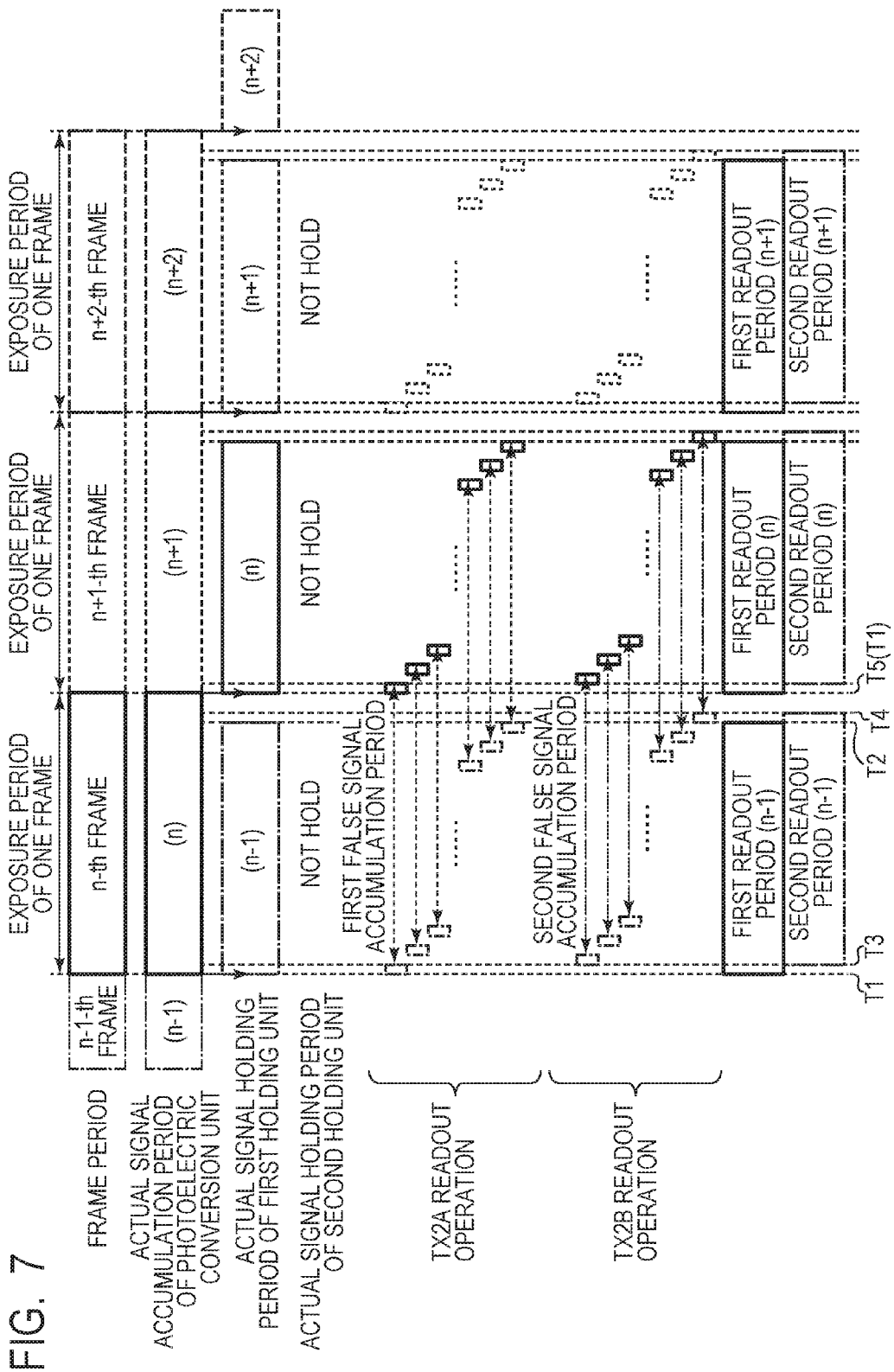
FIG. 7 is a diagram schematically illustrating operation of an imaging device according to a second embodiment of the present invention.
Figure 8:
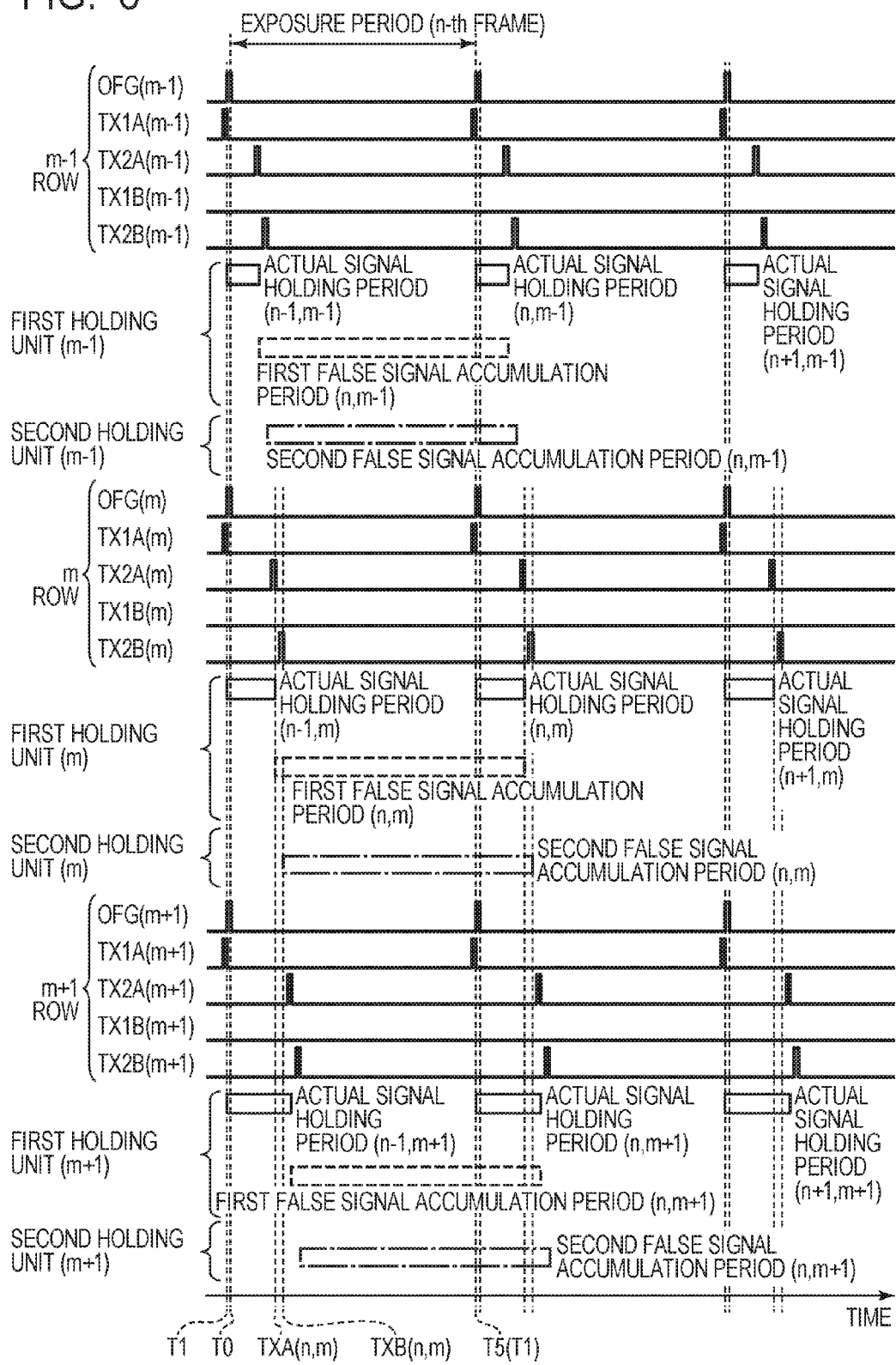
FIG. 8 is a timing chart of control signals of the imaging device according to the second embodiment of the present invention.

FIG. 7 is a diagram schematically illustrating the operation of the imaging device according to the present embodiment, and FIG. 8 is a timing chart of the imaging device according to the present embodiment.

In FIG. 4 and FIG. 5 of the first embodiment, the first readout period and the second readout period are set in separate periods, respectively. In contrast, in FIG. 7 and FIG. 8 of the present embodiment, the second readout period is arranged immediately after the first readout period in a readout period of each row. This configuration enables the imaging device of the present embodiment to continuously acquire a signal read out in the first readout and a signal read out in the second readout. In the configuration in which the first readout period and the second readout period are set in separate periods as seen in the first embodiment, it is necessary to temporarily hold a signal of every readout period in a memory such as a frame memory in order to perform a differential process or the like after the completion of readout. In the present embodiment, it is possible to continuously acquire signals in readout on one row without performing transfer on another row between these periods and therefore, with one memory being provided on every output column, it is possible to perform calculation for correction, which allows for a simplified configuration of the imaging system.

According to the present embodiment, in addition to being able to obtain the same advantages as those in the first embodiment, since the first readout and the second readout are continuously performed without transfer of a different row being performed between these periods, the configuration of the imaging system can be simplified.

Third Embodiment

An imaging device according to the third embodiment will be described. In the first embodiment, the first transfer transistor M1A is turned on only one time in each frame. In contrast, the present embodiment is different from the first embodiment in that the drive method is configured such that the first transfer transistor M1A is again turned on after the end of the first readout period. The configuration of the present embodiment will be described below with omission or simplification of the configuration similar to that in the first embodiment.

Figure 9:
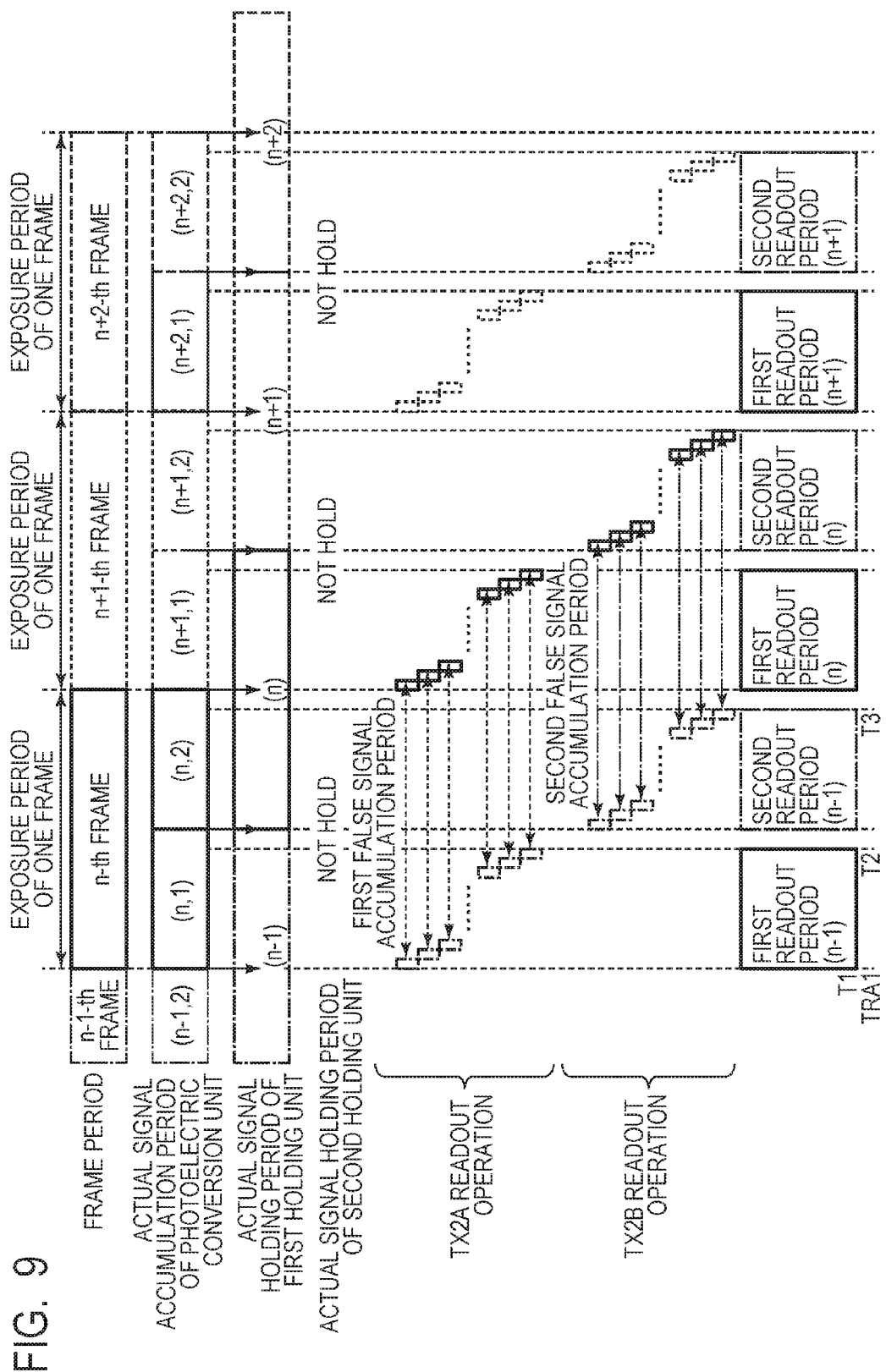
FIG. 9 is a diagram schematically illustrating operation of an imaging device according to a third embodiment of the present invention.
Figure 10:
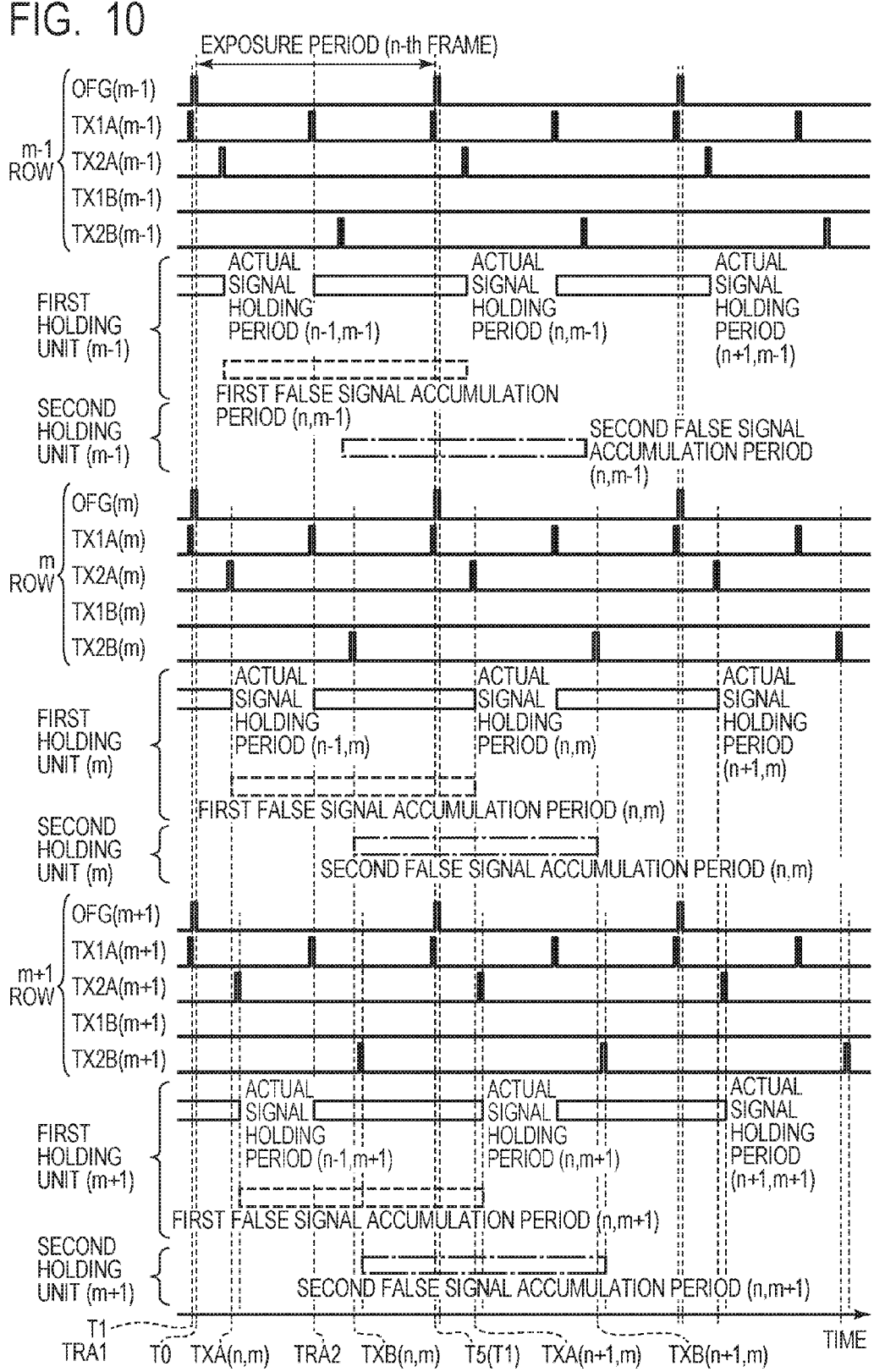
FIG. 10 is a timing chart of control signals of the imaging device according to the third embodiment of the present invention.

FIG. 9 is a diagram schematically illustrating the operation of the imaging device according to the present embodiment, and FIG. 10 is a timing chart of the imaging device according to the present embodiment.

In the drive method of FIG. 4 and FIG. 5 of the first embodiment, after the control signal TX1A becomes temporarily high level immediately before the time T1 (also referred to as TRA1 in the present embodiment), the control signal TX1A is maintained in low level until the time also immediately before the time T5. That is, the first transfer transistor M1A is turned on only one time during a one-frame period. In contrast, in the drive method of FIG. 9 and FIG. 10 of the present embodiment, in addition to the above, the control signal TX1A becomes high level immediately before the time TRA2, and thereby the first transfer transistor M1A is turned on. That is, the first transfer transistor M1A is turned on twice during a one-frame period. In such a way, since two times of transfer of charges from the photoelectric conversion unit 1 to the first holding unit 2A can be performed, a signal of up to substantially twice the saturation charge amount of the photoelectric conversion unit 1 can be acquired without overflow. This allows for an extended dynamic range of an image acquired by the imaging device.

Note that, although the number of times of turning on of the first transfer transistor M1A is two as an example in the present embodiment, any number of times can be properly set as long as the number is plural. The number of times of turning on of the first transfer transistor M1A may be further increased by shortening the first readout period by adjusting the design of the readout circuit or adjusting a drive method such as reducing rows to be read out. In this case, the dynamic range can be further extended in accordance with the number of times.

According to the present embodiment, in addition to being able to obtain the same advantages as those in the first embodiment, the dynamic range of an image acquired by the imaging device can be extended by performing multiple times of transfer of charges for every frame by the first transfer transistor. Therefore, an image can be acquired at a higher accuracy.

Fourth Embodiment

An imaging device according to the fourth embodiment will be described. In the first embodiment, the second transfer transistor M1B is maintained to be off during an exposure period. That is, actual signal charges are not transferred from the photoelectric conversion unit 1 to the second holding unit 2B, and the second false signal charges only are accumulated in the second holding unit 2B. When a relatively larger noise is generated when the first transfer transistor M1A is turned on, however, this may result in a larger difference between false signal charges accumulated in the first holding unit 2A and false signal charges accumulated in the second holding unit 2B. Thus, the accuracy of correction may decrease. To address this, in the present embodiment, the number of times of the first transfer transistor M1A being turned on and the number of times of the second transfer transistor M1B being turned on are matched during an exposure period of one frame, and thereby the above-described difference of false signal charges is reduced. The configuration of the present embodiment will be described below with omission or simplification of the configuration similar to that in the first embodiment.

Figure 11:
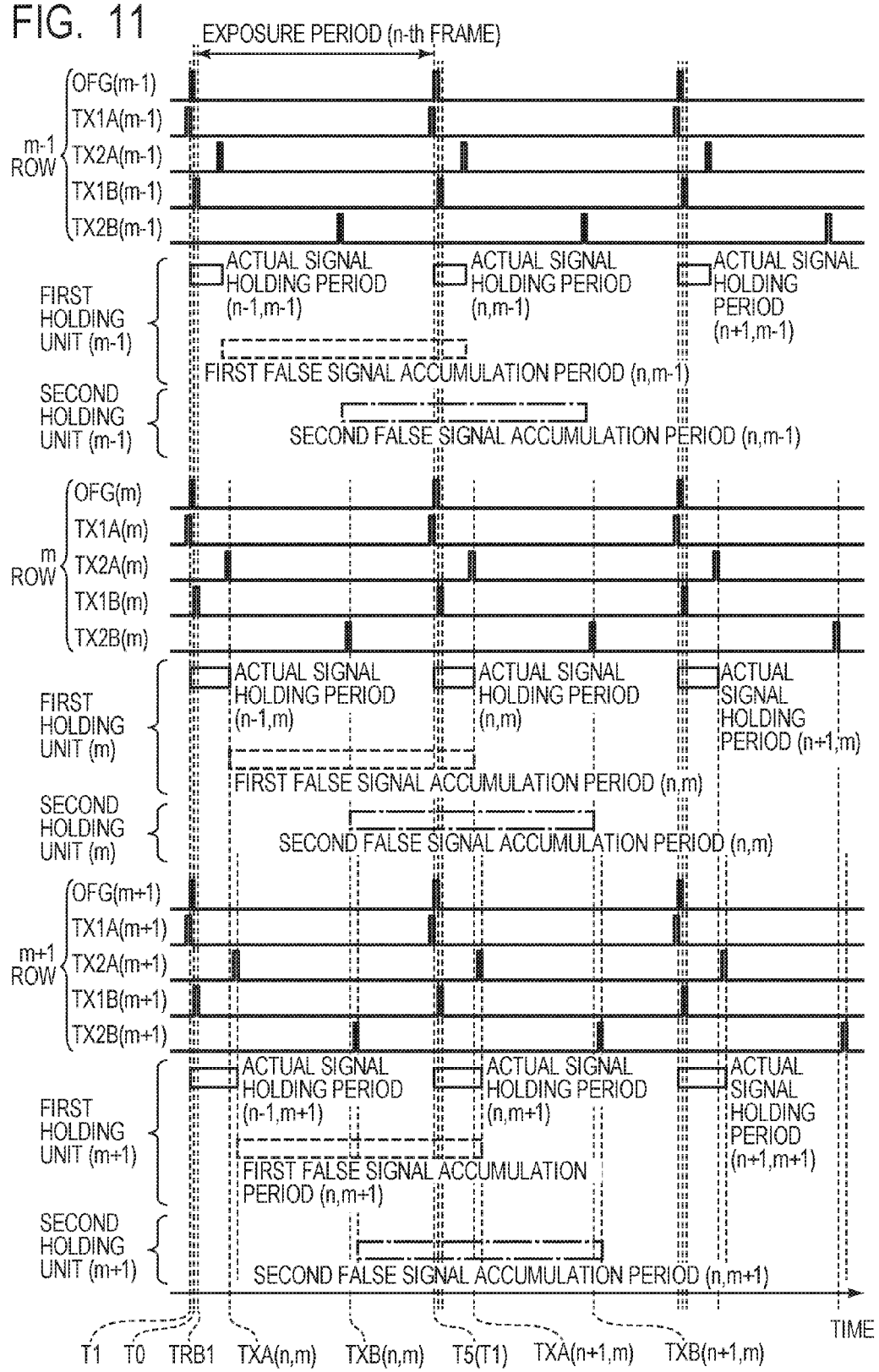
FIG. 11 is a timing chart of control signals of an imaging device according to a fourth embodiment of the present invention.

FIG. 11 is a timing chart of the imaging device according to the present embodiment. In FIG. 5 of the first embodiment, the control signal TX1B is maintained in low level. In contrast, in FIG. 11 of the present embodiment, such operation is performed that the control signal TX1B is high level on and after the time T0 and immediately before the time TRB1, and the control signal TX1B then becomes low level at the time TRB1. This makes a difference from the first embodiment in that, immediately after the overflow transistor M6 is turned off, the second transfer transistor M1B is temporarily turned on with the first transfer transistor M1A being in an off-state. In such a way, one time of operation in which the second transfer transistor M1B is turned on is added in the present embodiment. Thus, there are one time of the first transfer transistor M1A being turned on and one time of the second transfer transistor M1B being turned on during an exposure period of one frame, which results in the same number of times of transfer. This can cause the amount of a noise generated due to turning on of the first transfer transistor M1A and the amount of a noise generated due to turning on of the second transfer transistor M1B to be closer to each other. Therefore, the difference between the first false signal charges accumulated in the first holding unit 2A and the second false signal charges accumulated in the second holding unit 2B is reduced, which allows for an improved accuracy of correction.

Note that, although each of the number of times of the first transfer transistor M1A being turned on and the number of times of the second transfer transistor M1B being turned on is one for every frame as an example in the present embodiment, it may be two or more, that is, multiple times may be applied. When the number is two or more, with the same number of turning on of the first transfer transistor M1A and the second transfer transistor M1B for each frame, the difference of false signal charges is reduced allowing for an improved accuracy of correction.

According to the present embodiment, in addition to being able to obtain the same advantages as those in the first embodiment, influence of a noise generated when the transfer transistors are turned on can be reduced, and therefore the accuracy of correction can be further improved.

Fifth Embodiment

An imaging device according to the fifth embodiment will be described. The present embodiment is different from the first embodiment in that, while actual signal charges are not transferred to the second holding unit 2B in the first embodiment, actual signal charges are transferred to the second holding unit 2B in the present embodiment. The configuration of the present embodiment will be described below with omission or simplification of the configuration similar to that in the first embodiment.

Figure 12:
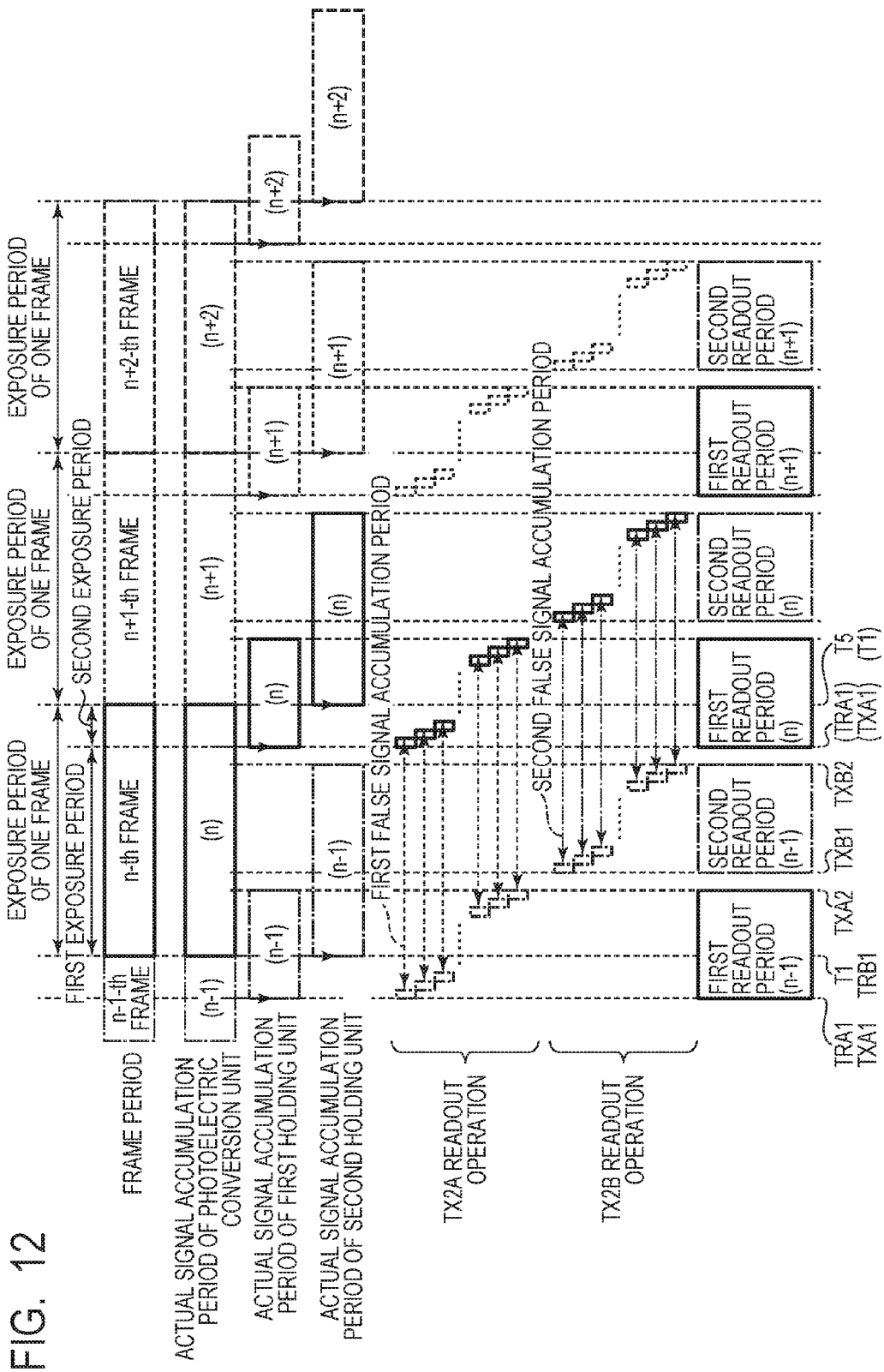
FIG. 12 is a diagram schematically illustrating operation of an imaging device according to a fifth embodiment of the present invention.
Figure 13:
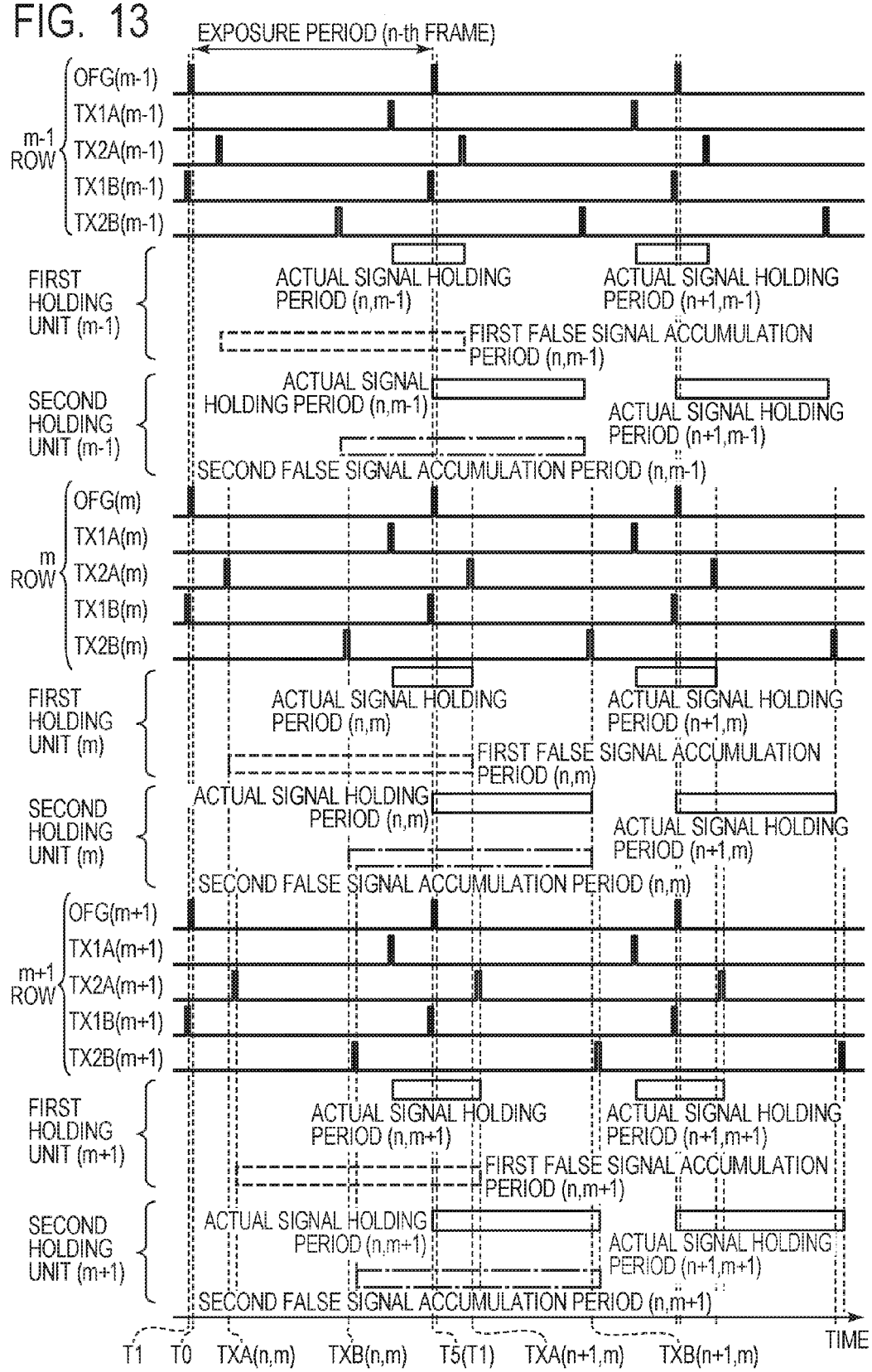
FIG. 13 is a timing chart of control signals of the imaging device according to the fifth embodiment of the present invention.

FIG. 12 is a diagram schematically illustrating the operation of the imaging device according to the present embodiment, and FIG. 13 is a timing chart of the imaging device according to the present embodiment.

In the present embodiment, the time TRA1 when actual signal charges accumulated during the n−1-th frame period are transferred from the photoelectric conversion unit 1 to the first holding unit 2A is the time before the time T1. Further, the time TXA1 when the first readout period for reading out actual signal charges from the first holding unit 2A starts the time before the time T1. The time when the first readout period ends is the time TXA2. The time when actual signal charges are transferred from the photoelectric conversion unit 1 to the second holding unit 2B is the time TRB1. In the present embodiment, the time TRB1 is the same as the time T1. The second readout period for reading out actual signal charges from the second holding unit 2B starts at the time TXB1 and ends at the time TXB2.

According to such a readout method, actual signal charges accumulated in the photoelectric conversion unit 1 during a period (first exposure period) from the time T0 to the time TRA1 are transferred to the first holding unit 2A. Further, actual signal charges accumulated in the photoelectric conversion unit 1 during a period (second exposure period) from the time TRA1 to the time TRB1 are transferred to the second holding unit 2B. That is, actual signal charges accumulated in the photoelectric conversion unit 1 during an exposure period of one frame are allocated to the first holding unit 2A and the second holding unit 2B on a period basis. Then, the first false signal charges and a part of the actual signal charges (first actual signal charges) are read out from the first holding unit 2A in the first readout period, and the second false signal charges and the remaining part of the actual signal charges (second actual signal charges) are read out in the second readout period. By acquiring these differences, false signal charges can be corrected in a similar manner to the first to fourth embodiments.

In the present embodiment, a value corresponding to a smaller amount of actual signal charges is obtained compared to the first embodiment. That is, substantially the same effect as that resulted from a shortened exposure period can be obtained. The effect is equal to draining a part of the charges accumulated in the photoelectric conversion unit 1 to the overflow transistor M6. Further, the amount of a reduction of an exposure period can be adjusted by the setting of the time IRA1. In such a way, in the present embodiment, in addition to being able to obtain the same advantages as those in the first embodiment, an exposure period can be adjusted without changing the operation of the overflow transistor M6, which allows for easier control of the signal level in accordance with a capturing state.

Furthermore, the present embodiment can be modified to a circuit configuration in which the overflow transistor M6 is omitted. As described above, the imaging device of the present embodiment can control the accumulation time without using the overflow transistor M6. Therefore, the circuit configuration can be modified to omit the overflow transistor M6. In other words, the photoelectric conversion unit 1 may not have any other path for draining charges than the first transfer transistor M1A and the second transfer transistor M1B and may be configured to drain charges only from the first transfer transistor M1A and the second transfer transistor M1B. In this modified example, since the area for the overflow transistor M6 can be reduced when respective components of the pixel 10 are arranged on a semiconductor substrate, the pixel area is reduced allowing for an improved flexibility of the arrangement of respective components.

Sixth Embodiment

An imaging device according to the sixth embodiment will be described below. An imaging device of the present embodiment has a configuration in which the function of changing a signal amplification factor (gain) in reading out a signal from the pixel 10 is added to the column amplification circuit 102 or the like in the imaging device of any of the first to fifth embodiments.

The false signal corresponds to a dark current, a charge leakage component, and a noise component that occurs photoelectric conversion in the holding unit itself due to insufficient light-shielding of the holding unit or the like. Therefore, the signal amount of a false signal may be much smaller than the signal amount of an actual signal. In such a case, it may be difficult to acquire a false signal at a high accuracy because of the influence of a random noise component or the like that may inflows in the peripheral circuit. Although it appears to be possible to acquire a false signal at a high accuracy by increasing a gain, a sufficient dynamic range may not be ensured in this case because the level of an actual signal is also increased.

Thus, in the present embodiment, different gains of the column amplification circuit 102 are applied to the first readout for reading out the first signal based on the actual signal charges and the first false signal charges and to the second readout for reading out the second signal based on the second false signal charges. More specifically, the gain of the column amplification circuit 102 in the second readout for reading out the second signal is set larger than the gain in the first readout for reading out the first signal. By setting the gain of the column amplification circuit 102 in such a way, it is possible to reduce influence on a false signal such as a random noise component that may inflow in a peripheral circuit portion of the imaging device while ensuring the dynamic range of an actual signal. Thereby, a false signal can be acquired at a higher accuracy. For example, the signal amount of a false signal can be substantially fourfold by setting, to a factor of one, the gain of the column amplification circuit 102 in the first readout and setting, to a factor of four, the gain of the column amplification circuit 102 in the second readout, and therefore a false signal is acquired at a high accuracy.

By using the second signal obtained in such a way to perform signal processing such as a differential process, a false signal component can be corrected at a high accuracy even when the signal amount of a false signal is small, and therefore a noise can be further reduced. Note that, in order to match the level of false signals included in the first signal and the second signal, it is necessary to adjust the value of a signal in accordance with the ratio of the gain and then perform a differential process. For example, when the gain in the second readout is four times the gain in the first readout as seen in the above-described example, adjustment such as dividing the value of the second signal by four before a differential process may be required.

The column amplification circuit 102 may be configured to be able to determine the signal level and switch the gain between multiple values. In this case, since the second signal can be read out by a larger gain of the multiple gains, the same effect can be obtained. Further, the column amplification circuit 102 may be configured to be able to output a plurality of signals with gain values that are different from each other at a time. Also in this case, the same effect can be obtained by using the second signal read out with a larger gain of the multiple gains for correction.

Switching of gains is not limited to be performed in the column amplification circuit 102. For example, it is possible to switch the gain as well by switching the capacitance of the floating diffusion unit 3 included in the pixel 10. As an example of a specific configuration, such a configuration may be employed that an additional capacitor with a switch is connected in parallel to the capacitor of the floating diffusion unit 3. Its own capacitance of the floating diffusion unit 3 is denoted as C1, and the capacitance of the additional capacitor is denoted as C2. When reading out the first signal, the combined capacity provided at the floating diffusion unit 3 is set to C1+C2 by controlling the selection switch of the additional capacitor to be on. When reading out the second signal, the capacity provided at the floating diffusion unit 3 is set to C1 by controlling the selection switch of the additional capacitor to be off. This enables switching of the gain by switching of the capacitance at the floating diffusion unit 3.

Seventh Embodiment

Figure 14:
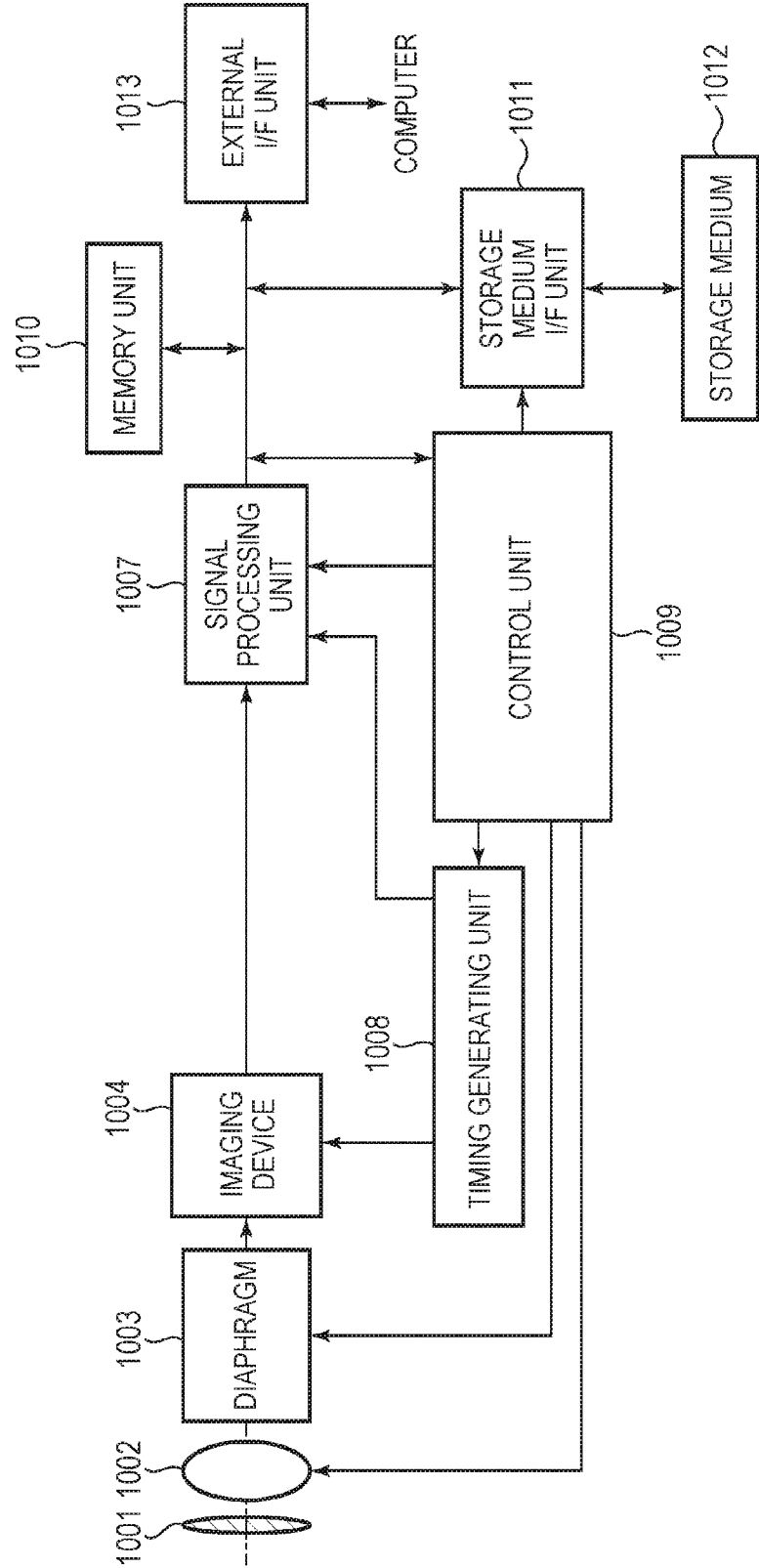
FIG. 14 is a block diagram of an imaging system according to a seventh embodiment of the present invention.

An imaging system according to the seventh embodiment will be described below by using FIG. 14. The imaging system of the present embodiment has the imaging device of any of the first to sixth embodiments and may be, for example, a digital still camera, a digital camcorder, a copier machine, a fax machine, a cellular phone, an on-vehicle camera, an observation satellite, or the like. Further, the imaging system may include a camera module having optics such as a lens and the imaging device. FIG. 14 illustrates a block diagram of a digital still camera as an example of the imaging system. The imaging system of FIG. has a lens protection barrier 1001, a lens 1002, a diaphragm 1003, an imaging device 1004, a signal processing unit 1007, a timing generating unit 1008, a control unit 1009, a memory unit 1010, a storage medium I/F unit 1011, a storage medium 1012, an external I/F unit 1013.

The lens protection barrier 1001 protects the lens 1002. The lens 1002 captures an optical image of an object on the imaging device 1004. The diaphragm 1003 changes the light amount passing through the lens 1002. The imaging device 1004 is the imaging device described in the first to sixth embodiments and converts an optical image captured by the lens 1002 into image data. The signal processing unit 1007 performs various correction or data compression on the captured data output from the imaging device 1004. The timing generating unit 1008 outputs various timing signals to the imaging device 1004 and the signal processing unit 1007. The control unit 1009 controls the entire digital still camera. The memory unit 1010 temporarily stores image data. The storage medium I/F unit 1011 performs storage or readout of the storage medium 1012. The storage medium 1012 is a removable storage medium such as a semiconductor memory for performing storage or readout of captured data. The external I/F unit 1013 communicates with an external computer or the like.

Note that the timing signal may be supplied from the outside of the imaging system, and the imaging system of the present embodiment may be any imaging system as long as it has at least the imaging device 1004 and the signal processing unit 1007 that processes a captured signal output from the imaging device 1004. The AD conversion unit may be provided on a semiconductor substrate of the imaging device 1004 and may be provided on a separate semiconductor substrate of the imaging device 1004. Further, the imaging device 1004 and the signal processing unit 1007 may be formed on the same semiconductor substrate.

Other Embodiments

The embodiments described above are mere examples of the present invention, and modification of the present embodiment is possible without departing from the spirit of the present invention. While the photoelectric conversion unit 1 that generates electrons is used in the embodiments described above, the photoelectric conversion unit 1 that generates holes may be used. In this case, the conduction type of transistors forming the pixel 10 will be the opposite conduction type. Further, the source and the drain of the transistors may be replaced in accordance with the conduction type of the transistors.

In the first to sixth embodiments, although the first and second readout periods have the same length, the first readout period may be longer than the second readout period. This is because, in general, the amount of false signal charges is smaller than that of actual signal charges and it is therefore possible to reduce the length of the second readout period for readout of false signal charges to be shorter than the length of the first readout period. In this case, since the total time of the first and second readout periods can be reduced and thus the time for one frame can be reduced, the frame rate can be increased. Further, by reducing the second readout period to be shorter than the first readout period without increasing the frame rate, a margin can be provided to the first readout period, which allows for a reduction of power consumption and a reduction of a noise.

In the third embodiment, although the intervals of multiple times of charge transfer from the photoelectric conversion unit 1 to the first holding unit 2A during an exposure period of one frame are substantially the same, respective intervals of transfer may be different. Furthermore, it is possible to dynamically control the intervals of charge transfer in accordance with the brightness of an object by using a control method of such as applying a shorter interval of charge transfer to increase the number of times of transfer when an object is bright.

In the first to sixth embodiments, the first transfer transistor M1A transfers charges from the photoelectric conversion unit 1 to the first holding unit 2A by being turned on after the end of the second readout period. The timing at which the first transfer transistor M1A is turned on may be properly set as long as it is after the end of the second readout period, such as may be immediately after the end of the second readout period, or may be after a predetermined time has elapsed from the end of the second readout period.

In the first to sixth embodiments, when at least one of the first signal and the second signal is sufficiently small, for example, when at least one of the first false signal charges and the second false signal charges are small, a process for acquiring a difference may result in an increased noise component. In such a way, when at least one of the first signal and the second signal has a value smaller than a predetermined threshold, the imaging device or the imaging system may output an output signal of the first readout period without performing signal processing such as acquiring a difference.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-116083, filed Jun. 10, 2016, which is hereby incorporated by reference herein in its entirety.

What is claimed is:

1. An imaging device comprising:
    a plurality of pixels, each of the plurality of pixels including a photoelectric conversion unit configured to accumulate charges generated by an incident light, a first holding unit and a second holding unit configured to hold the charges, an amplification unit configured to output a signal based on the charges, a first transfer switch provided between the photoelectric conversion unit and the first holding unit, a second transfer switch provided between the photoelectric conversion unit and the second holding unit, a third transfer switch provided between the first holding unit and the amplification unit, and a fourth transfer switch provided between the second holding unit and the amplification unit; and
a controller,
wherein the controller controls the first transfer switch, the second transfer switch, the third transfer switch, and the fourth transfer switch so that:
by being controlled to be on, the first transfer switch transfers, from the photoelectric conversion unit to the first holding unit, actual signal charges accumulated in the photoelectric conversion unit in an exposure period of one frame,
by being maintained to be off from a time when the fourth transfer switch is controlled to be off to a time when again controlled to be on, the second transfer switch does not transfer the actual signal charges from the photoelectric conversion unit to the second holding unit, and
by being controlled to be on after the exposure period, the third transfer switch transfers, from the first holding unit to the amplification unit, the actual signal charges transferred to the first holding unit and first false signal charges accumulated in the first holding unit, and
by being controlled to be on, the fourth transfer switch transfers, from the second holding unit to the amplification unit, a second false signal charges accumulated in the second holding unit.

2. The imaging device according to claim 1,
wherein the plurality of pixels are arranged to form a plurality of rows, and
transfer of the third transfer switch and transfer of the fourth transfer switch included in pixels arranged on the same row of the plurality of rows are continuously performed without transfer to pixels on another row being performed therebetween.

3. The imaging device according to claim 1, wherein the first transfer switch performs transfer of the actual signal charges multiple times on a frame basis.

4. An imaging device comprising:
a plurality of pixels, each of the plurality of pixels including a photoelectric conversion unit configured to accumulate charges generated by an incident light, a first holding unit and a second holding unit configured to hold the charges, an amplification unit configured to output a signal based on the charges, a first transfer switch provided between the photoelectric conversion unit and the first holding unit, a second transfer switch provided between the photoelectric conversion unit and the second holding unit, a third transfer switch provided between the first holding unit and the amplification unit, and a fourth transfer switch provided between the second holding unit and the amplification unit; and
a controller,
wherein the controller controls the first transfer switch, the second transfer switch, the third transfer switch, and the fourth transfer switch so that:
by being controlled to be on, the first transfer switch transfers, from the photoelectric conversion unit to the first holding unit, actual signal charges accumulated in the photoelectric conversion unit in an exposure period of one frame,
the second transfer switch is temporarily turned on after the photoelectric conversion unit starts accumulation of the charges with the first transfer switch being maintained to be off,
by being controlled to be on after the exposure period, the third transfer switch transfers, to the amplification unit, actual signal charges transferred to the first holding unit and first false signal charges accumulated in the first holding unit, and
by being controlled to be on, the fourth transfer switch transfers a second false signal charges accumulated in the second holding unit to the amplification unit.

5. The imaging device according to claim 4, wherein the number of times of the first transfer switch being turned on and the number of times of the second transfer switch being turned on are the same for every frame.

6. An imaging device comprising:
a plurality of pixels, each of the plurality of pixels including a photoelectric conversion unit configured to accumulate charges generated by an incident light, a first holding unit and a second holding unit configured to hold the charges, an amplification unit configured to output a signal based on the charges, a first transfer switch provided between the photoelectric conversion unit and the first holding unit, a second transfer switch provided between the photoelectric conversion unit and the second holding unit, a third transfer switch provided between the first holding unit and the amplification unit, and a fourth transfer switch provided between the second holding unit and the amplification unit; and
a controller,
wherein the controller controls the first transfer switch, the second transfer switch, the third transfer switch, and the fourth transfer switch so that:
by being controlled to be on, the first transfer switch transfers, from the photoelectric conversion unit to the first holding unit, first actual signal charges accumulated in the photoelectric conversion unit in a first exposure period of one frame,
by being controlled to be on, the second transfer switch transfers, from the photoelectric conversion unit to the second holding unit, second actual signal charges accumulated in the second exposure period after the first exposure period of the one frame,
by being controlled to be on after the first exposure period, the third transfer switch transfers, to the amplification unit, the first actual signal charges transferred to the first holding unit and first false signal charges accumulated in the first holding unit, and
by being controlled to be on after the second exposure period, the fourth transfer switch transfers, to the amplification unit, the second actual signal charges transferred to the second holding unit and second false signal charges accumulated in the second holding unit.

7. The imaging device according to claim 1,
wherein each of the plurality of pixels further includes a drain switch configured to drain the charges from the photoelectric conversion unit, and
wherein start of accumulation of the charges by the photoelectric conversion unit is triggered by the drain switch draining the charges from the photoelectric conversion unit.

8. The imaging device according to claim 6, wherein the photoelectric conversion unit can drain the charges only from the first transfer switch and the second transfer switch.

9. The imaging device according to claim 1, wherein a frequency of transfer by the fourth transfer switch is less than a frequency of transfer by the third transfer switch.

10. The imaging device according to claim 1 further comprising a signal processing circuit configured to perform signal processing by using a first signal based on charges transferred from the first holding unit to the amplification unit by the third transfer switch and a second signal based on charges transferred from the second holding unit to the amplification unit by the fourth transfer switch.

11. The imaging device according to claim 10, wherein the second signal is read out by a larger gain than the first signal is.

12. The imaging device according to claim 10, wherein the signal processing circuit performs signal processing for acquiring a difference between the first signal and the second signal.

13. The imaging device according to claim 10, wherein the signal processing circuit does not perform the signal processing when at least one of the first signal and the second signal has a value smaller than a predetermined threshold.

14. An imaging system comprising:
the imaging device according to claim 1; and
a signal processing unit configured to process a signal output from the imaging device.

15. The imaging system according to claim 14, wherein the signal processing unit performs signal processing by using a first signal based on charges transferred from the first holding unit to the amplification unit by the third transfer switch and a second signal based on charges transferred from the second holding unit to the amplification unit by the fourth transfer switch.

16. The imaging system according to claim 15, wherein the second signal is read out by a larger gain than the first signal is.

17. The imaging system according to claim 15, wherein the signal processing unit performs signal processing for acquiring a difference between the first signal and the second signal.

18. The imaging system according to claim 15, wherein the signal processing unit does not perform the signal processing when at least one of the first signal and the second signal has a value smaller than a predetermined threshold.

* * * * *